(12) United States Patent
Bowen et al.

(10) Patent No.: US 7,829,170 B1
(45) Date of Patent: Nov. 9, 2010

(54) PTFE MEMBRANES AND GASKETS MADE THEREFROM

(75) Inventors: Christopher Bowen, Lincoln University, PA (US); Kevin Edward Dove, Wilmington, DE (US); Carl Jones, Baltimore, MD (US); Raymond B. Minor, Elkton, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 190 days.

(21) Appl. No.: 11/059,849

(22) Filed: Feb. 16, 2005

Related U.S. Application Data

(62) Division of application No. 10/382,668, filed on Mar. 6, 2003.

(51) Int. Cl.
*B32B 3/22* (2006.01)
(52) U.S. Cl. .................. 428/66.4; 428/315.5; 524/545; 526/242; 526/250
(58) Field of Classification Search ................. 524/545; 526/250, 242; 428/66.4, 315.5
See application file for complete search history.

(56) References Cited

U.S. PATENT DOCUMENTS

| 2,776,465 | A | | 1/1957 | Smith ............................ 28/82 |
| 3,953,566 | A | * | 4/1976 | Gore ........................... 264/505 |
| 5,098,625 | A | | 3/1992 | Huang et al. |
| 5,814,405 | A | * | 9/1998 | Branca et al. .......... 428/311.51 |
| 5,879,465 | A | | 3/1999 | Dolan et al. ................ 428/212 |
| 5,879,789 | A | | 3/1999 | Dolan et al. |
| 5,964,465 | A | * | 10/1999 | Mills et al. .................. 277/316 |
| 6,136,933 | A | | 10/2000 | Jones ......................... 526/255 |
| 6,485,809 | B1 | * | 11/2002 | Minor et al. ............... 428/66.4 |
| 2005/0225037 | A1 | * | 10/2005 | Dove .......................... 277/610 |

FOREIGN PATENT DOCUMENTS

| JP | 11080705 | A | 3/1999 |
| WO | 96/07842 | A | 3/1996 |

OTHER PUBLICATIONS

PCT International Search Report for PCT/US2004/007062.

* cited by examiner

*Primary Examiner*—Peter D. Mulcahy
*Assistant Examiner*—Henry Hu
(74) *Attorney, Agent, or Firm*—Dianne Burkhard; Carol A. Lewis White

(57) ABSTRACT

Improved expanded PTFE materials and improved gasket materials made therefrom, the gaskets being capable of forming a seal with greater bolt load retention than is possible with existing PTFE gaskets. The expanded PTFE membranes of the invention can be tailored to exhibit a matrix tensile strength in at least one direction of at least 25,000 psi, a matrix tensile strength ratio in two orthogonal directions of between 0.25 and 4, an orientation index of 50° or less, and a density of 2.0 g/cc or less. The improved gaskets exhibit improved mechanical properties such as high bolt load retention, low creep, high tensile strength, low stress to seal and high crystallinity index.

18 Claims, 12 Drawing Sheets

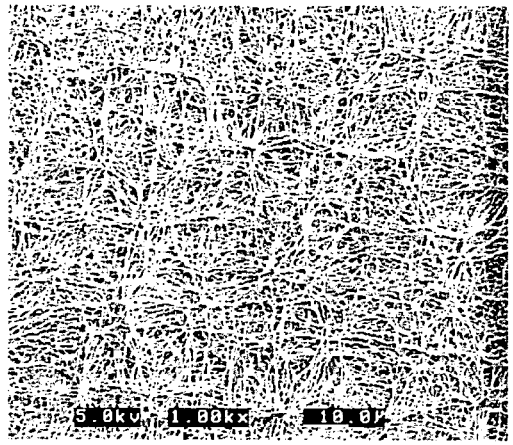 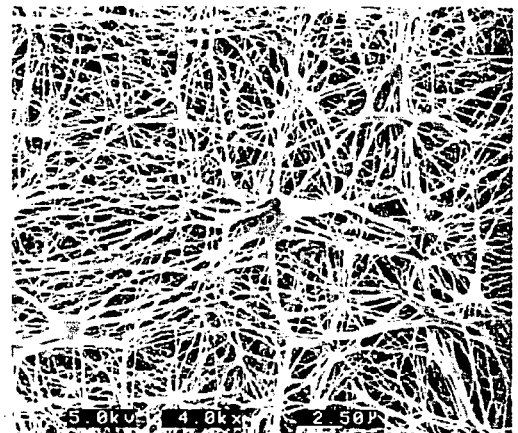
FIG. 5A            FIG. 5B
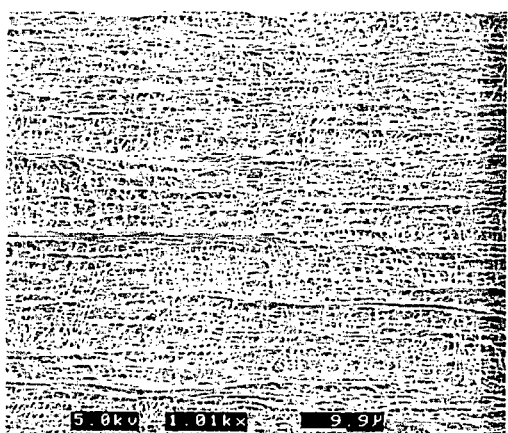 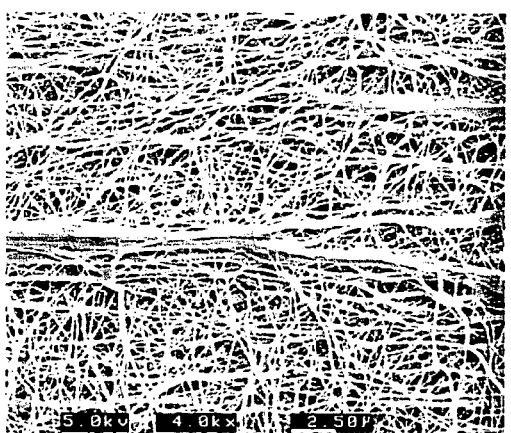
FIG. 6A            FIG. 6B

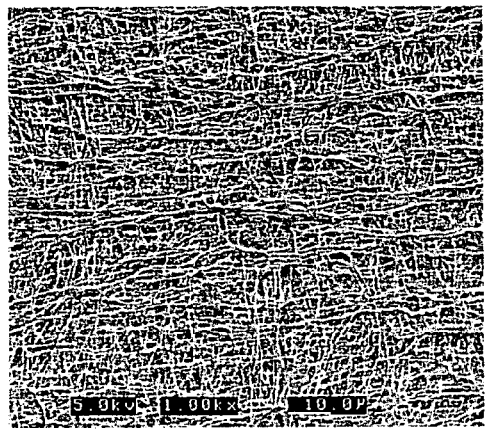
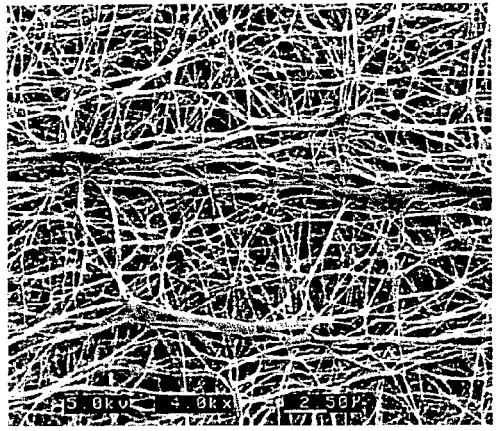
FIG. 9A            FIG. 9B
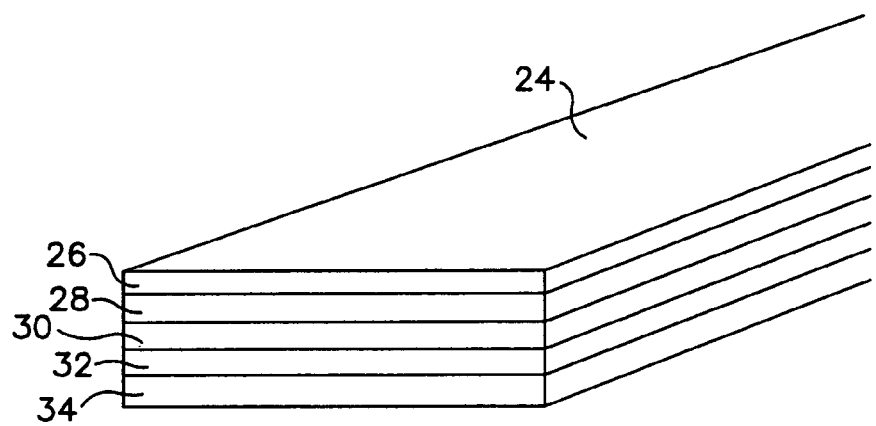
FIG. 10

PTFE MEMBRANES AND GASKETS MADE THEREFROM

RELATED APPLICATIONS

The present application is a divisional application of U.S. patent application Ser. No. 10/382,668, filed Mar. 6, 2003.

FIELD OF THE INVENTION

The present invention relates to improved expanded PTFE materials and to improved gaskets made therefrom, the gaskets being capable of forming a seal with greater bolt load retention than is possible with existing PTFE gaskets.

BACKGROUND OF THE INVENTION

A wide variety of gaskets are known for use in sealing applications. Expanded polytetrafluoroethylene (PTFE) is widely used today as a gasket material. As disclosed in U.S. Pat. No. 3,953,566 to Gore, this material has numerous properties making it highly desirable as a gasket. These properties include being readily compressible and conformable, being chemically resistant, having relatively high strength, and being far less prone to creep and loss of sealing pressure than non-expanded, non-porous PTFE alone.

In many sealing applications, the gasket is used to seal the junction between flanges, such as between pipes. In such applications, expanded PTFE is a desirable material for the gaskets because the expanded PTFE gasket can be placed between the flanges, and the flanges can then be pressed together with the application of force, such as by tightening of bolts. This application of force compresses the expanded PTFE. As the expanded PTFE is compressed, its initial pore volume is reduced, thus densifying the expanded PTFE. Particularly with metal-to-metal flanges, it is possible to apply sufficient force (or "stress") to the flanges to fully density the expanded PTFE. Thus, in at least part of the expanded PTFE gasket, the pore volume is reduced to substantially zero, such that a fluid contained within the pipes is prevented from leaking between the flanges by the densified, non-porous PTFE gasket, which seals the flanges.

In many applications, particularly when harsh chemicals are used which would readily break down the metal or the metal could contaminate the chemical which is being transported or housed, it is common to use glass-lined steel, glass, or fiberglass reinforced plastic ("FRP") piping and vessels. Because this equipment is so often used with extremely harsh chemicals, there is great desire to use PTFE gaskets to seal the connecting flanges of this equipment because of the well known extraordinary chemical resistance of PTFE. Unfortunately, non-expanded, non-porous PTFE gaskets are generally not conformable enough to effectively seal this type of equipment. In the case of glass-lined steel flanges, although there is a relatively smooth finish, there is often a large amount of unevenness or lack of flatness associated with the flanges. This unevenness or lack of flatness requires the gasket to have to conform to large variations around the perimeter as well as between the internal and external diameter of the flange in order to create an effective seal. Thus, a non-expanded, non-porous PTFE gasket is not conformable enough to seal many of these applications.

Because expanded PTFE is so conformable, it would be desirable to use expanded PTFE to seal these commonly uneven flanges. Unfortunately, in many of these applications it is not possible to apply sufficient force to the flanges to create enough gasket stress to fully density the expanded PTFE gasket to create an effective seal. For example, glass-lined steel piping flanges, glass flanges, or FRP piping flanges may deform, fracture, or break upon the application of a high amount of stress. Thus, in these applications, an expanded PTFE gasket may not be completely densified to reach a non-porous state, and therefore does not become leak proof, because the maximum stress that can be applied to the flanges without breaking them is not sufficient to so densify the gasket.

U.S. Pat. No. 6,485,809, in the name of Minor et al., teaches a low stress to seal gasket construction comprising a multilayer, unitary gasket including at least one inner layer of expanded PTFE disposed between a first substantially air impermeable outer layer and a second substantially air impermeable outer layer, and a substantially air impermeable region bridging the first and second substantially air impermeable layers. By "low stress to seal" is meant a gasket which provides a substantially air tight, or air impermeable, seal upon the application of a relatively low stress (i.e., a stress below that required to fully densify a porous expanded PTFE gasket, generally less than about 20,700 kPa (3000 psi)). The Minor et al. gasket forms a substantially air impermeable seal when compressed at low stress. This patented construction overcomes many challenges in creating a desired low stress to seal gasket. However, improvements to such a construction are still desirable.

While expanded PTFE materials exhibit much better performance than non-expanded, non-porous PTFE in gasket applications, it still exhibits some propensity to creep, or flow, under load. Thus, expanded PTFE materials with improved performance characteristics are desirabe.

It has been taught that PTFE structures can be stretched above the melt temperature to impart improved properties to the PTFE. U.S. Pat. No. 2,776,465, to Smith, for example, teaches stretching non-expanded PTFE materials at temperatures above about 325° C. to achieve higher tenacity and modulus in the resulting structures.

U.S. Pat. No. 5,814,405, to Branca et al., teaches heating an expanded amorphously locked article to a temperature above the crystalline melting temperature of the PTFE and stretching in at least the direction orthogonal to the direction of stretch carried out below the melt temperature. The resulting articles exhibit a microstructure which can be characterized as having highly elongated nodes with aspect ratios greater than 25 to 50, preferably greater than 150. Such membranes also exhibit high air flow and high strength. These membranes are useful as filters in filtration devices, as scaffolding for holding reactive or conductive fillers and as support layers in composite constructions.

A need has existed, however, for improved expanded PTFE materials with enhanced properties to meet the ever-increasing demands for improved gasketing performance, as well as for other high performance applications.

Particularly, while it is desirable to provide low stress to seal characteristics in a gasket, it is also important from a performance perspective for a gasket to exhibit good bolt load retention, which is a measure of the resistance to stress relaxation of the gasket material. The amount of leakage associated with a gasketed assembly is dependent on the amount of compressive load, also known as bolt load, on the gasket. "Bolt load retention," as used herein, is intended to refer to the retention of the compressive load supplied to a gasket through a pair of flanges from the tightening of the bolts or clamps used to fasten the pair of flanges. Typically, the higher the bolt load on a gasket the lower the leakage will be from that gasketed assembly. PTFE gaskets (i.e., greater than about 50% PTFE, by weight) are prone to creep and stress relaxation when subjected to a compressive load. Reducing the amount of creep and stress relaxation in the gasket material results in higher bolt load retention by the gasket. Higher bolt load retention in the gasket produces a tighter seal with less leakage over the life of the gasket.

Thus, what has been desired for many years is an easy-to-use, highly chemically resistant gasket which can effectively conform to flange surfaces and sustain a high bolt load retention to maintain a tight seal over the life of the gasket. Accordingly, a purpose of the present invention is to provide not only such high performance gaskets, but also to provide improved expanded PTFE materials which can be used to achieve these goals.

Further, it has been desired to provide a highly chemical resistant, highly conformable gasket which not only has the ability to seal at low loads, but also sustains a high bolt load retention even when subjected to high loads. Such a universal gasket could be effectively used for both low load applications such as glass-lined steel, glass and FRP piping and vessels, as well as for high load applications such as with metal piping and vessels.

These and other purposes of the present invention will be provided herein.

SUMMARY OF THE INVENTION

The present invention concerns improved expanded PTFE membranes and gasketing materials and gaskets incorporating these improved PTFE membranes.

The improved expanded PTFE membranes exhibit improved combinations of mechanical properties which were heretofore not achieved by the teachings of the prior art. Specifically, PTFE membranes of the invention can be tailored to exhibit a matrix tensile strength in at least one direction of at least 25,000 psi (172 MPa), with a matrix tensile strength ratio in two orthogonal, or perpendicular, directions of between 0.25 and 4, and an orientation index of 50° or less. Densities of these membranes are 2.0 g/cc or less, more preferably 1.9 g/cc or less, more preferably 1.8 g/cc or less, even more preferably 1.7 g/cc or less, more preferably 1.6 g/cc or less, more preferably 1.5 g/cc or less, more preferably 1.0 g/cc or less and most preferably 0.5 g/cc or less. In an alternative embodiment, the membranes may exhibit a matrix tensile strength in at least one direction of at least 34,000 psi (234 MPa), more preferably at least 44,800 psi (309 MPa), a matrix tensile strength ratio between 0.25 and 4 and a density of 2.0 g/cc or less. The membranes can further exhibit a crystallinity index greater than 50%, more preferably greater than 60%, and most preferably greater than 68%; and an enthalpy of at least 9.0 J/g, more preferably at least 10.0 J/g, and most preferably at least 11.0 J/g. Orientation indices of less than 50°, more preferably less than 40°, even more preferably less than 30°, and most preferably less than 20° can also be achieved in the unique membranes of the invention.

Expanded PTFE membranes of the present invention exhibiting such combinations of improved mechanical properties are prepared by ram extruding a lubricated PTFE powder to form a tape, then calendering, drying, stretching in the machine, or longitudinal, direction at temperatures at or above 325° C., then stretching perpendicular to the machine direction (i.e., the transverse direction) again at temperatures at or above 325° C. while constraining the tape from shrinking in the longitudinal direction, then subjecting the stretched tape to a 380° C. heat zone while constrained. A unique feature of the present invention is that by varying the degree of calendering of the tape, and by varying the stretch temperatures, stretch rates and stretch ratios for both directions, membranes which are surprisingly strong and which have very balanced strengths can be produced. In addition, higher crystallinity and lower orientation indices can be achieved. Suitable processing variations for achieving membranes with these enhanced properties are contained in the Examples herein.

It was discovered that the improved PTFE membranes of this invention can be incorporated into gasket materials and gaskets exhibiting improved mechanical properties such as high bolt load retention, low creep, high tensile strength, low stress to seal and high crystallinity index. Moreover, it was discovered that PTFE gaskets exhibiting the highest bolt load retention and lowest creep characteristics ever produced could be constructed using these improved PTFE membranes. As used herein for convenience, the term "gasket" is intended to refer to materials in sheet, tape or finished (i.e., cut or shaped, such as annular, etc.) gasket form.

In one embodiment, the gasket material of the present invention comprises a multilayer construction comprising PTFE membrane. For example, the gasket material may be formed by wrapping the PTFE membrane onto a mandrel to a desired thickness, heating to unify the layers into a unitary multilayer construction, then cutting the construction off the mandrel to yield a sheet of gasket material. Depending on the desired end application, gaskets may be cut or configured from the gasket material to any specified dimensions.

Alternatively, the gasket materials of this invention may be cut from the mandrel to form a continuous, form-in-place gasket, such as is described in U.S. Pat. No. 5,964,465. In a further embodiment, the gasket materials of the present invention may be incorporated into a low stress to seal gasket construction such as that described in U.S. Pat. No. 6,485,809. In a further embodiment, the gasket materials of the present invention may be incorporated into a gasket construction such as that described in U.S. Pat. No. 5,879,789.

BRIEF DESCRIPTION OF THE DRAWINGS

The present invention is described herein in conjunction with the accompanying drawings, in which:

FIGS. 5a and 5b are SEMs taken at 1000× and 4000×, respectively, of the membrane made in accordance with Example 5.

FIGS. 6a and 6b are SEMs taken at 1000× and 4000×, respectively, of the membrane made in accordance with Example 6.

FIGS. 9a and 9b are SEMs taken at 1000× and 4000×, respectively, of the membrane made in accordance with Example 9.

FIG. 10 is a three-quarter perspective view of one embodiment of a gasket or gasket material of the present invention.

DETAILED DESCRIPTION OF THE INVENTION

The present invention concerns improved expanded PTFE membranes and gasketing materials and gaskets incorporating these improved PTFE membranes.

Figure 1A:
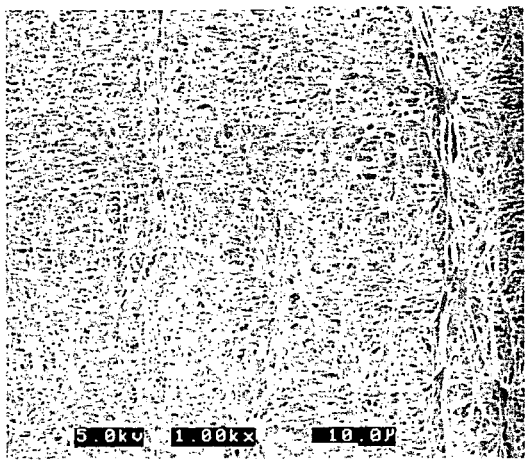
FIGS. 1a and 1b are scanning electron micrographs (SEMs) taken at 1000× and 4000×, respectively, of the membrane made in accordance with Example 1.
Figure 1B:
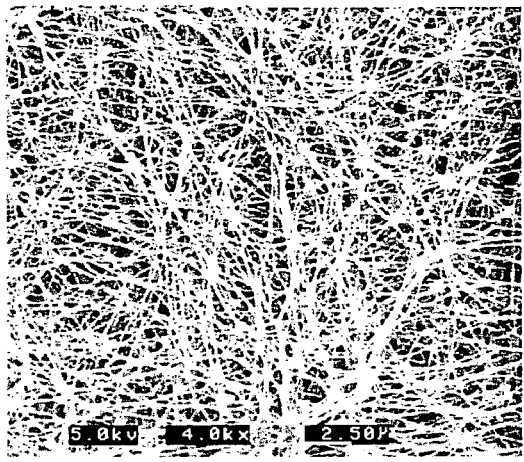

Referring to FIGS. 1a and 1b, there is shown a scanning electron micrograph (SEM) at 1000× and 4000×, respectively, of an exemplary membrane of the present invention made in accordance with Example 1, herein. The membrane is observed to have a structure of small nodes (less than 1 μm in diameter) connected by randomly arranged fibrils.

Figure 2A:
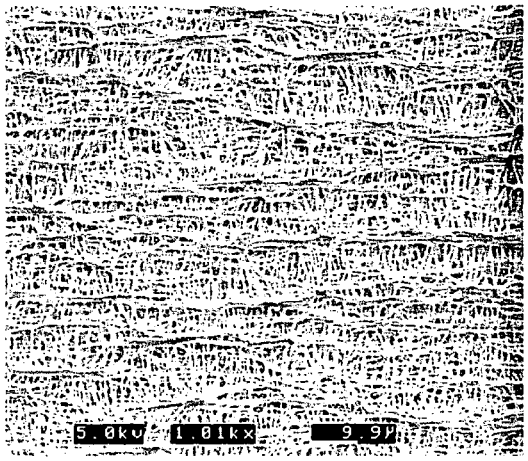
FIGS. 2a and 2b are SEMs taken at 1000× and 4000×, respectively, of the membrane made in accordance with Example 2.
Figure 2B:
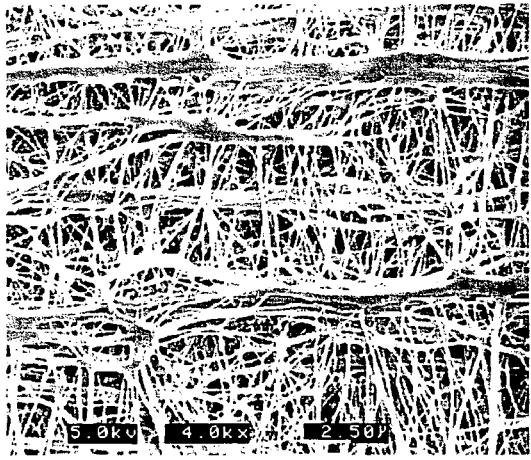

Referring to FIGS. 2a and 2b, there is shown an SEM at 1000× and 4000×, respectively, of a membrane of the present invention made in accordance with Example 2, herein. The membrane is observed to have a structure of elongated nodes running in parallel connected by fibrils which are largely perpendicular to the major node axis.

Figure 3A:
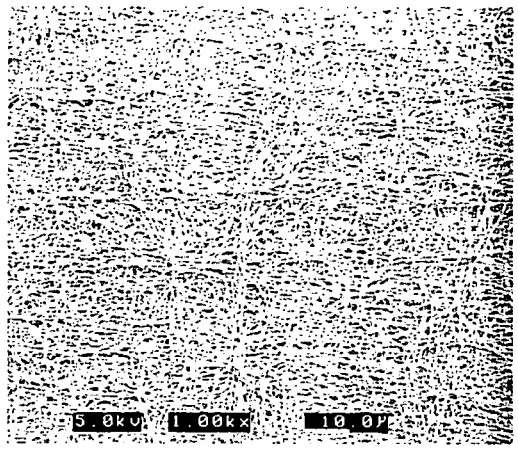
FIGS. 3a and 3b are SEMs taken at 1000× and 4000×, respectively, of the membrane made in accordance with Example 3.
Figure 3B:
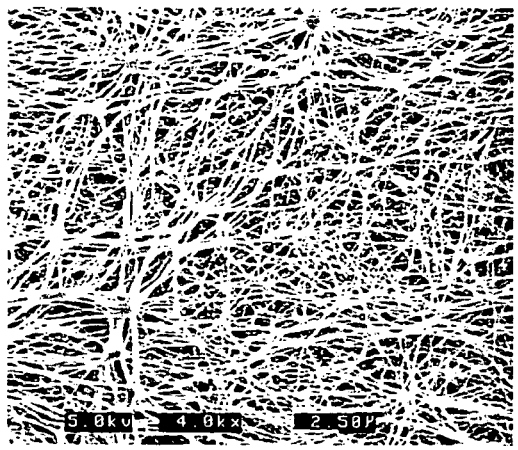

Referring to FIGS. 3a and 3b, there is shown an SEM at 1000× and 4000×, respectively, of a membrane of the present invention made in accordance with Example 3, herein. The membrane is observed to have a structure of small nodes (less than 2 μm) connected by randomly arranged fibrils.

Figure 4A:
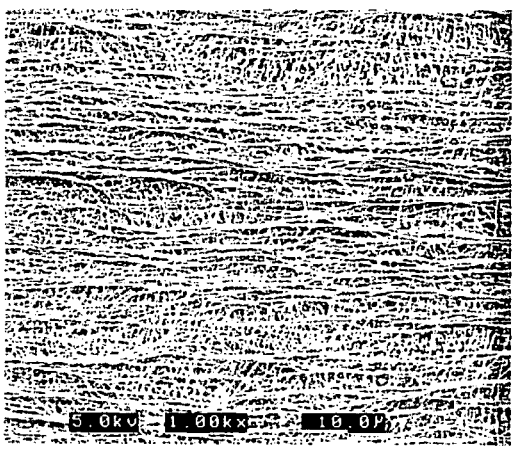
FIGS. 4a and 4b are SEMs taken at 1000× and 4000×, respectively, of the membrane made in accordance with Example 4.
Figure 4B:
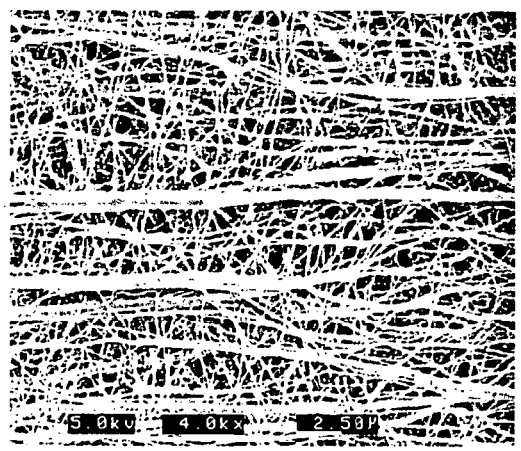

Referring to FIGS. 4a and 4b, there is shown an SEM at 1000× and 4000×, respectively, of a membrane of the present invention made in accordance with Example 4, herein. The membrane is observed to have a structure of elongated nodes running in parallel connected by fibrils which are largely perpendicular to the major node axis.

Referring to FIGS. 5a and 5b, there is shown an SEM at 1000× and 4000×, respectively, of a membrane of the present invention made in accordance with Example 5, herein. The membrane is observed to have a structure of small nodes (less than about 5 μm for the major axis) connected by randomly arranged fibrils.

Referring to FIGS. 6a and 6b, there is shown an SEM at 1000× and 4000×, respectively, of a membrane of the present invention made in accordance with Example 6, herein. The membrane is observed to have a structure of elongated nodes running in parallel connected by fibrils which are largely perpendicular to the major node axis.

Figure 7A:
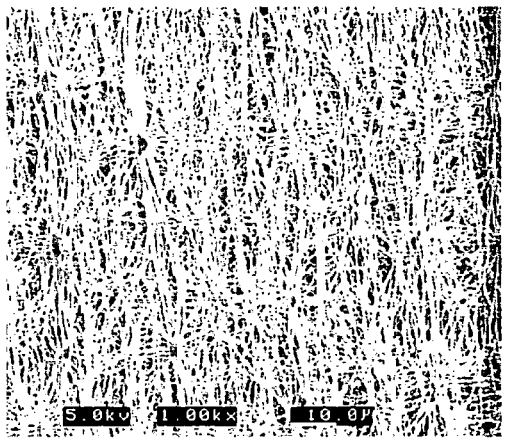
FIGS. 7a and 7b are SEMs taken at 1000× and 4000×, respectively, of the membrane made in accordance with Example 7.
Figure 7B:
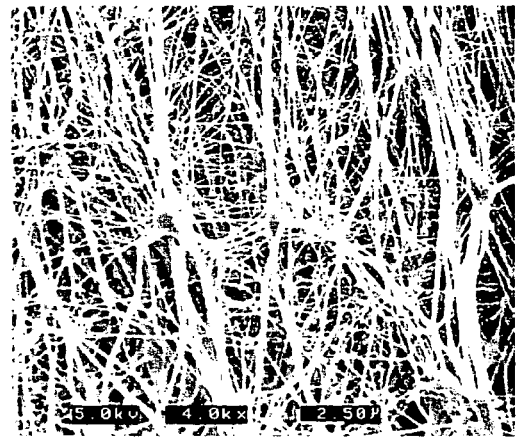

Referring to FIGS. 7a and 7b, there is shown an SEM at 1000× and 4000×, respectively, of a membrane of the present invention made in accordance with Example 7, herein. The membrane is observed to have a structure of small nodes (less than 5 μm for the major axis) connected by fibrils arranged largely in one direction.

Figure 8A:
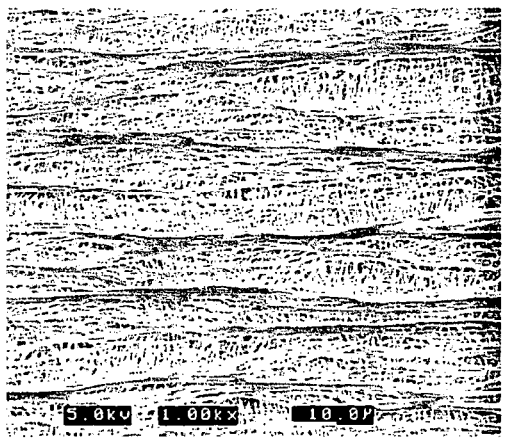
FIGS. 8a and 8b are SEMs taken at 1000× and 4000×, respectively, of the membrane made in accordance with Example 8.
Figure 8B:

Referring to FIGS. 8a and 8b, there is shown an SEM at 1000× and 4000×, respectively, of a membrane of the present invention made in accordance with Example 8, herein. The membrane is observed to have a structure of elongated nodes running in parallel connected by fibrils which are largely perpendicular to the major node axis.

Referring to FIGS. 9a and 9b, there is shown an SEM at 1000× and 4000×, respectively, of a membrane of the present invention made in accordance with Example 9, herein. The membrane is observed to have a structure consisting essentially of very fine elongated nodes (less than about 2 μm in width) running in parallel connected by fibrils which are largely perpendicular to the major node axis.

The mechanical properties of the present expanded PTFE (ePTFE) membranes can be tailored to exhibit unique combinations of mechanical properties not achieved in the prior art. For example, a membrane comprising a single layer of ePTFE can be made having a matrix tensile strength in at least one direction of at least 25,000 psi, with a matrix tensile strength ratio in two orthogonal directions of between 0.25 and 4 and a density of 2.0 g/cc or less.

PTFE membranes of the invention can have a matrix tensile strength in at least one direction of at least 25,000 psi, with a matrix tensile strength ratio in two orthogonal directions of between 0.25 and 4, an orientation index of about 50° or less, and a density of 2.0 g/cc or less. In more preferred embodiments, the membranes have a matrix tensile strength in at least one direction of at least 34,000 psi, and more preferably at least 44,800 psi and even lower densities, as noted earlier herein.

Membranes of the invention preferably exhibit an orientation index of 50° or less. The orientation index is a characterization of the degree of directional molecular alignment of the PTFE chains making up the node and fibril structure. Orientation indices of less than 40°, more preferably less than 30°, and most preferably less than 20° may be achieved in the present invention.

The membranes of the present invention can also exhibit a crystallinity index of at least 60%. The crystallinity index is a measure of the degree of molecular order of the PTFE chains making up the node and fibril structure. This crystallinity index can also be characterized as inversely proportional to the number of crystalline defects present. Crystallinity indices of the membranes of the present invention may be tailored to be greater than about 65%, and most preferably greater than about 70% or greater.

Enthalpies of the expanded PTFE membranes of the present invention are typically at least about 9.0 J/g, more preferably at least about 10.0 J/g, and most preferably at least about 11.0 J/g.

The gasket materials of the present invention comprise PTFE membranes, preferably in a stacked or layered configuration, having a thickness which is tailored to meet the specific needs. For convenience, gaskets will be referred to herein as having a particular nominal, or approximate, thickness, which is consistent with the manner in which commercially available gasket thicknesses are reported. Typically, gasket manufacturers make gaskets of a particular thickness and label the material commercially with both nominal metric and English units. For example, a nominal 1.5 mm gasket will also be referred to as a nominal 1/16 inch gasket. Actual ranges of thickness can vary ±20% around these nominal reported thicknesses. For purposes of this invention, whenever nominal thicknesses are reffered to, both nominal English and nominal metric units are encompassed. For example, gaskets of nominal thickness of 1 mm (1/32 inch), 1.5 mm (1/16 inch), 3 mm (1/8 inch), 6 mm (1/4 inch) and 9 mm (3/8 inch) are most commonly available.

Shown in FIG. 10 is one embodiment of a gasket material 24 of the present invention. While the present invention is not limited to the number of layers shown in this figure, this exemplary gasket material 24 of the present invention comprises multiple layers 26, 28, 30, 32, and 34. Layers 26, 28, 30, 32, and 34 are self-adhered to each layer of which they are in contact, having exposed outside surfaces 26 and 34.

The gasket material 24 of the present invention can be produced by wrapping PTFE membranes on a mandrel, stacking membranes or other suitable formation techniques. As the term is used herein, a PTFE membrane may comprise a single membrane layer or, alternatively, multiple membrane layers having the same or different characteristics, provided that at least one of the layers is PTFE. For example, the membrane may comprise one or more layers of ePTFE membrane having the same or different membrane properties. Additionally, the PTFE membrane may comprise, for example, one or more additional layers having a chemical composition other than PTFE. The thickness of each PTFE membrane or layer may be approximately 0.0005 to 0.50 inch (0.013 to 12.7 mm), and preferably approximately 0.001 to 0.02 inch (0.025 to 0.51 mm). The gasket material may be formed in virtually any quadrilateral cross-sectional dimension of importance to sealing applications and may optionally be filled with particulate fillers or coated with polymeric materials prior to production of the gasket material.

Figure 11:
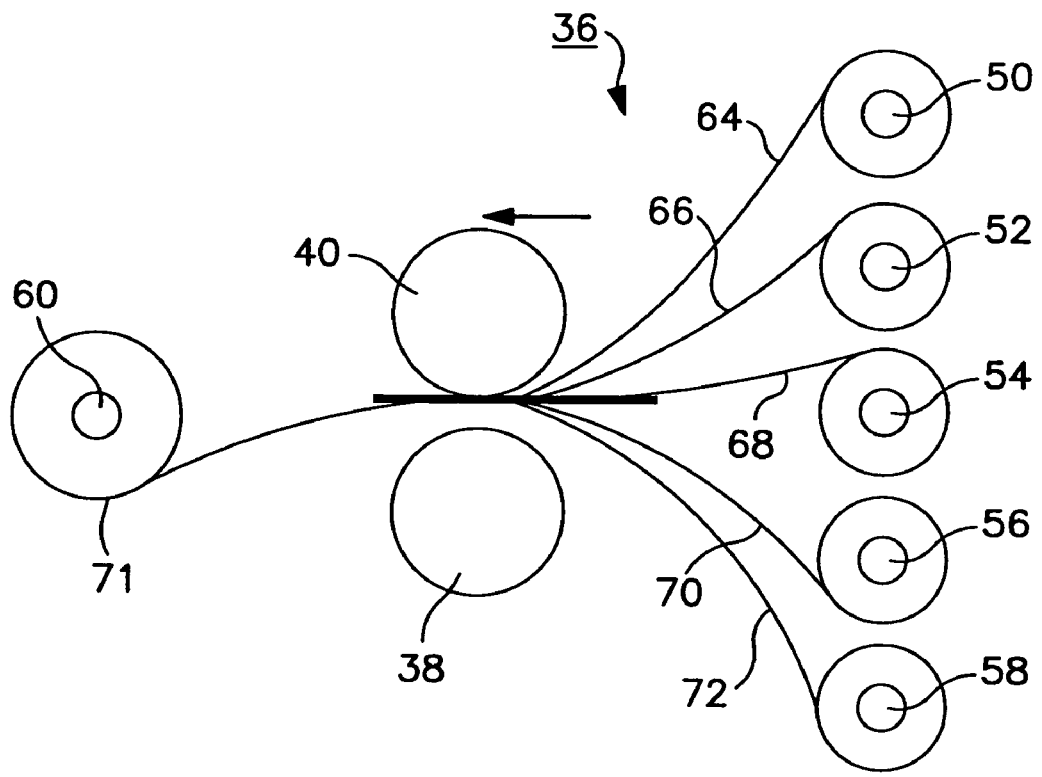
FIG. 11 is an elevational view of one embodiment of an apparatus which may be used to produce gaskets of the present invention.

FIG. 11 shows one embodiment of an apparatus 36 for forming the PTFE gasket elements of the present invention. The apparatus comprises two metal drums 38 and 40, having the capability for heat, a payoff 48 consisting of multiple payoff arms 50, 52, 54, 56, and 58 (not limited to this quantity), and a take-up 60.

In order to form a gasket material 24 of the instant invention, coiled lengths of PTFE 64, 66, 68, 70, and 72 (again, not limited to this quantity) are fed between drums 38 and 40 from pay-offs 50, 52, 54, 56, and 58. The outside surfaces of PTFE lengths 64 and 72 come into direct contact with drums 38 and 40 during formation of the gasket material. Drums 38 and 40 are typically of a surface that will not promote sticking and preferably are heated to maintain a temperature of between 300 and 450° C. The pressure, temperature, and speed applied by drums 38 and 40 should be such that the layers of PTFE 64, 66, 68, 70, and 72 being fed between them self adhere to one another, respectively, as they pass between the drums, thereby forming a gasket material 74 containing multiple layers of PTFE concentrically rolled and adhered to themselves. The tension supplied by the pay-off arms 50, 52, 54, 56, 58 and the take-up 60 should be controlled in such a way that the material before and after the drums remains substantially taut and does not droop.

Figure 12:
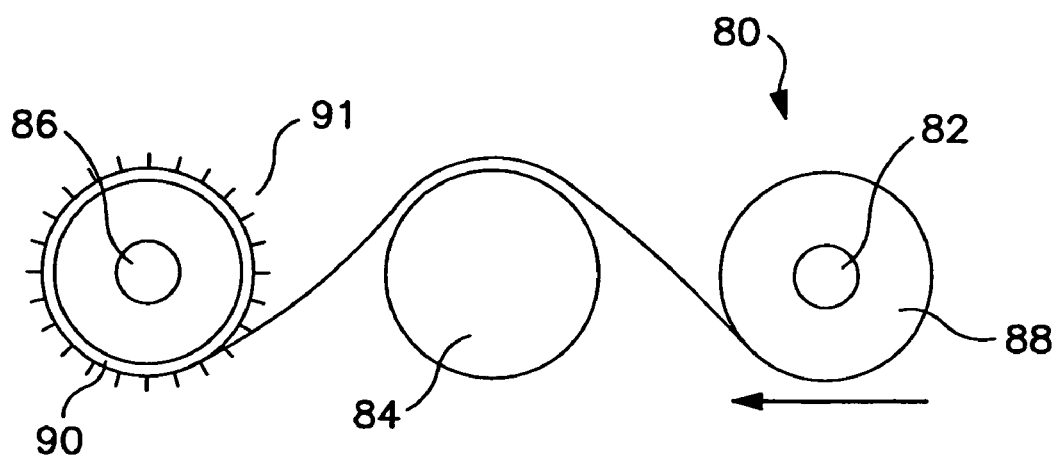
FIG. 12 is an elevational view of another embodiment of an apparatus which may be used to produce gaskets of the present invention.

FIG. 12 shows another embodiment of an apparatus 80 for forming the PTFE gasket material 24 of the present invention. This apparatus comprises a pay-off 82, idler drum 84, which, among other things, acts as a positioning control, take-up 86, and a mandrel 90 with pins 91 for restraining the material.

In order to form the PTFE element of the present invention, a coiled length of PTFE 88 membrane is fed from the pay-off 82, over the idler drum 84, and onto the mandrel 90. The PTFE 88 is layered upon itself as the mandrel is rotated by the take-up 86. When the required number of mandrel rotations or PTFE layers 92 have been delivered, the PTFE 88 is cut or severed and the mandrel is removed from the take-up 86. The mandrel 90 containing the PTFE layers 92 is heated at a temperature and through an adequate time duration such that the layers of PTFE 92 will self-adhere to each other, as described in more detail below. After the heating, the mandrel and PTFE are cooled and the gasket material is cut from the mandrel.

Figure 13:
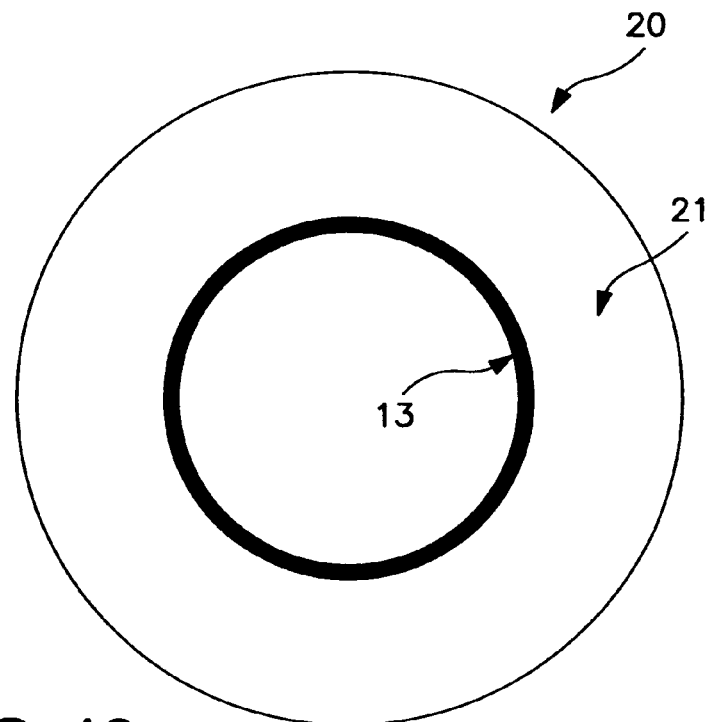
FIG. 13 is a top view of a gasket according to an exemplary embodiment of the present invention.
Figure 14:
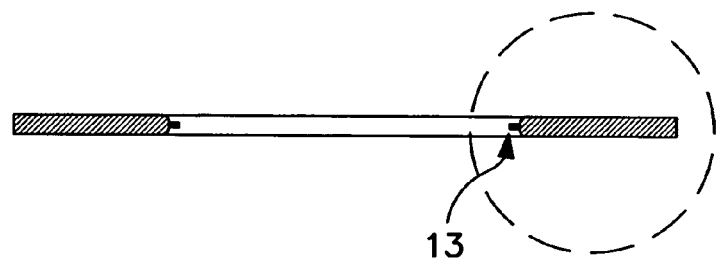
FIG. 14 is a side cross-sectional view of the gasket of FIG. 13.
Figure 15:
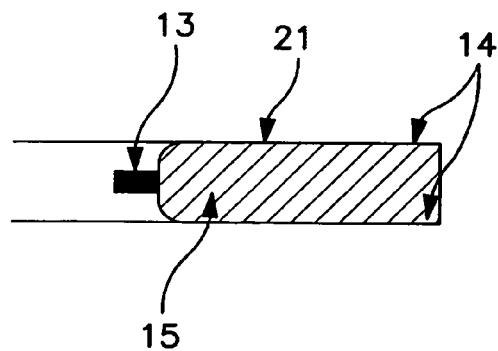
FIG. 15 is an exploded side cross-sectional view of a portion of the gasket of FIG. 14.

In an alternative embodiment, the gasket may be constructed in accordance with the teachings of U.S. Pat. No. 6,485,809 B1, the subject matter of which is specifically incorporated herein by reference, wherein the gasket includes at least one inner layer of expanded PTFE disposed between a first substantially air impermeable outer layer and a second substantially air impermeable outer layer. The gaskets further include a substantially air impermeable region located, for example, on an edge thereof or bridging two sections thereof. For example, as shown in FIGS. 13-15, a gasket 20 of the present invention may be constructed comprising a single chamber 21 with substantially air impermeable region 13 disposed on the inner periphery of gasket 20. Chamber 21 is formed of an inner layer 15 of expanded PTFE sandwiched by outer layers of substantially air impermeable layers 140.

Figure 16:
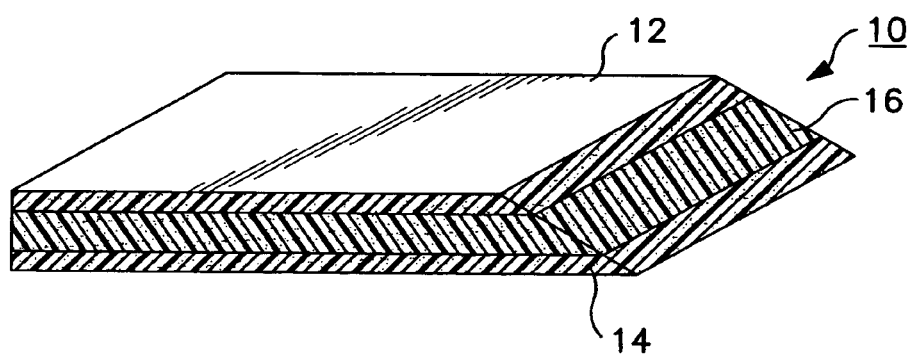
FIG. 16 is an elevational view of another embodiment of a gasket construction of the present invention.

Shown in FIG. 16 is an alternative embodiment of a gasket 10 which may be formed having the novel features of the present invention, and this construction is based on teachings in U.S. Pat. No. 5,879,789, in the names of Dolan et al, the subject matter of which is specifically incorporated herein by reference. This gasket 10 comprises external layers 12, 14 of a porous, expanded PTFE membrane of the present invention and a core material 16 of a higher rigidity PTFE membrane. Layer 12, 14 may be attached to the core material 16 in any suitable manner including by using an adhesive material, through melting, or other bonding method. The rigidity of the gasket is supplied by core 16. This material should be sufficiently stiff that the gasket will not "flop" when held on edge. Moreover, the core 16 comprises a fluoropolymer material that has the same chemical properties as the external layers 12, 14. Preferably, the core material 16 is an expanded PTFE layer that has a higher rigidity than the outer layers 12, 14. Once core 16 is formed, each of the external layers 12, 14 are positioned around the core 16 and the structure is then laminated together into the gasket material 10 of the present invention.

Figure 17:
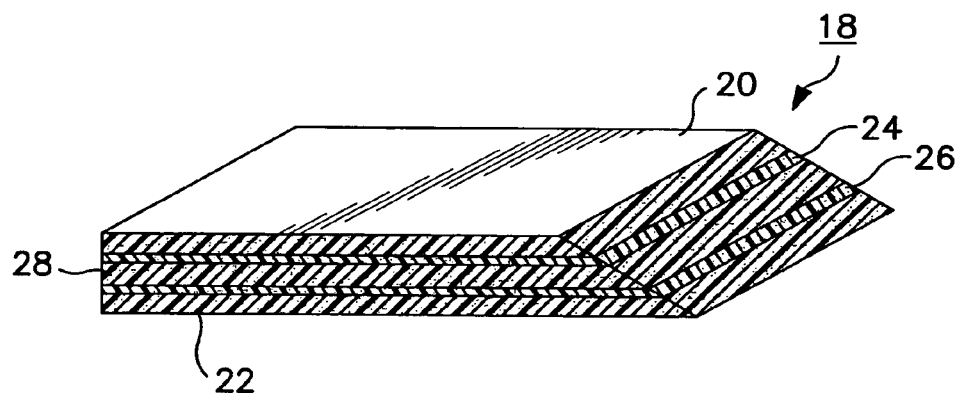
FIG. 17 is an elevational view of a further embodiment of a gasket construction of the present invention.

A further embodiment of the present invention is shown in FIG. 17, also based on the teachings of U.S. Pat. No. 5,879,789. In this embodiment, the gasket sheet material 18 comprises: outer layers 20, 22 of conformable PTFE material; rigid inner layers 24, 26 of rigid PTFE material attached to each of outer layers 20, 22, respectively; and a center layer 28 of conformable PTFE attached between each of the rigid inner PTFE material layers 24, 26. Although the properties of each of the layers may be modified to satisfy specific performance characteristics to the sheet 18, for most applications the conformable layers 20, 22, and 28 should comprise a flexible expanded PTFE material, such as that previously described. In the embodiment shown, outer layers 20, 22 are approximately 0.006" (0.15 mm) wide, and center layer 28 is approximately 0.034" (0.86 mm) wide. Similarly, the rigid inner layers 24, 26 comprise a densified expanded PTFE material, such as the core 16 previously described.

Figure 18:
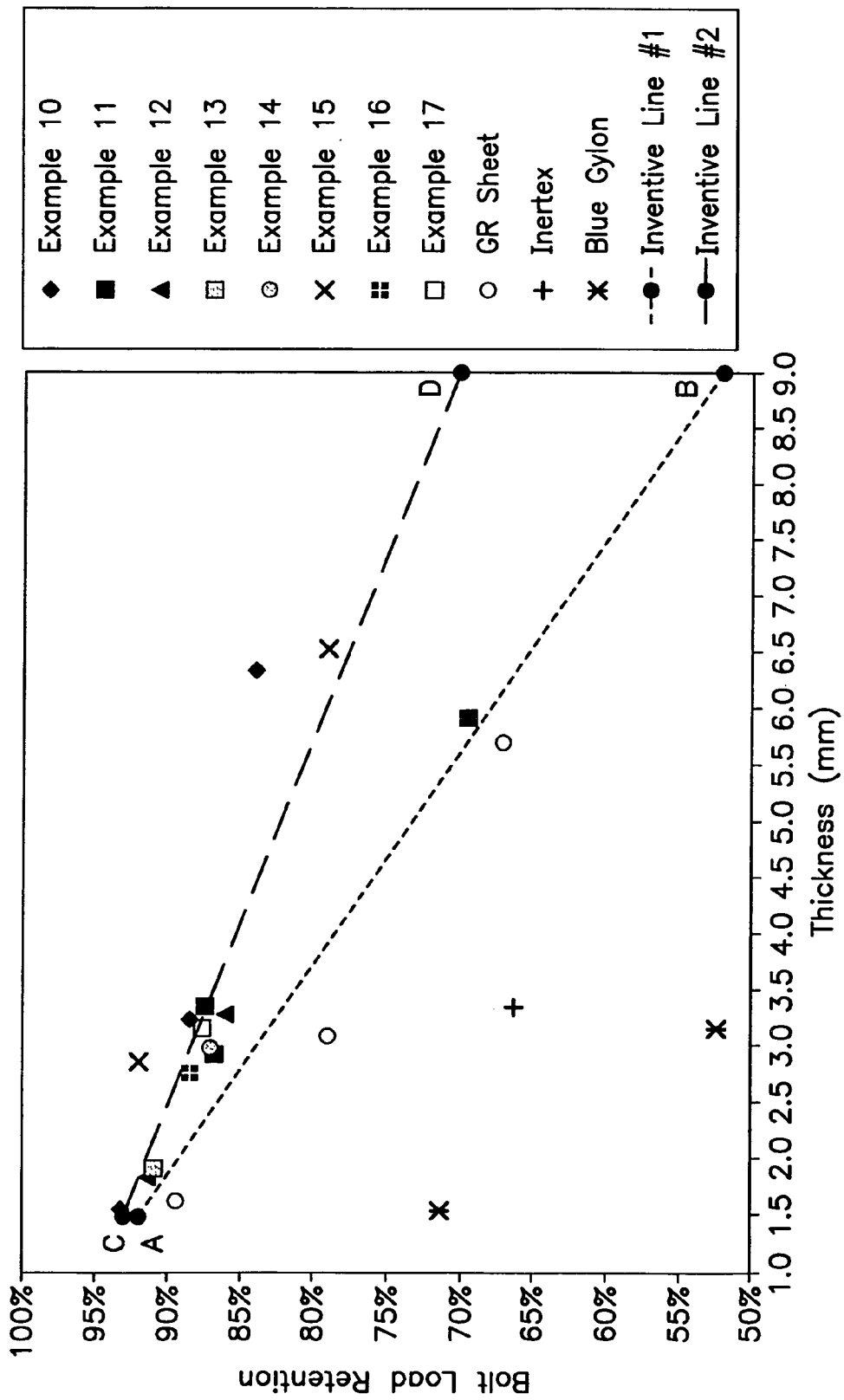
FIG. 18 is a graph showing plots indicating unique characteristics of bolt load retention versus thickness exhibited by gaskets of the present invention.

The improved gaskets of the present invention comprising PTFE desirably have a thickness in the range of about 1.5 mm to about 9 mm, a compressibility of at least about 40%, and a percent bolt load retention versus thickness equal to or greater than the line connecting points A and B in FIG. 18 and defined in the following table:

| Point | % BLR at RT | Thickness |
|-------|-------------|-----------|
| A     | 92%         | 1.5 mm    |
| B     | 52%         | 9 mm      |

In addition, gaskets of the present invention can exhibit a compressibility of at least 40%, a durometer of 85 or less, and a crystallinity of at least a bout 60%.

Alternatively, gaskets of the present invention may have a percent bolt load retention versus thickness equal to or greater than the line connecting the points C and D in FIG. 18 and defined in the following table:

| Point | % BLR at RT | Thickness |
|-------|-------------|-----------|
| C     | 93%         | 1.5 mm    |
| D     | 70%         | 9 mm      |

EXAMPLES

The present invention will now be described in conjunction with the following examples which are intended to illustrate the invention, not to limit it. In the examples, the following test methods were used.

Test Methods

DSC Measurement

Differential Scanning Calorimetry (DSC) was performed to determine the crystalline state of the material both before and after the transverse expansion process. The characterization before transverse expansion is performed to determine the level of heat conditioning that was applied through the machine direction expansion process. The equipment used to perform these measurements was a TA Differential Scanning Calorimeter (Model #2920), calibrated using an appropriate standard, with an attached refrigerated cooling unit (TA RCS Model #991100.901).

Sample preparation was accomplished by first cutting (using a scalpel or razor blade) a sample weighing approximately 10 milligrams out of the center of the ePTFE membrane web. The balance used to weigh the sample was a Mettler AT20 Electronic Microbalance. Once cut, the sample was then folded over on itself such that it fits into an aluminum sample pan (TA P/N 990999.901). The sample was placed into the pan, the supplied lid was placed on top of the sample and the lid was crimped in place using a sample press (TA Model #900680.902). This sample was then placed into the DSC testing chamber to be tested. The reference material that was used for this series of measurements was an empty aluminum sample pan and lid.

Once the sample and reference pan were inserted into the testing chamber, the atmosphere in and around the test chamber was purged with nitrogen gas. The testing cycle was set up to equilibrate at −20 degrees Celsius and then ramped to 60 degrees Celsius at a rate of 10 degrees Celsius per minute. At the conclusion of the test, an energy plot output is created showing the measured heat flow in watts/gram (i.e. the measured output normalized to the actual mass of the ePTFE sample being tested) versus the temperature during the scan. Using a program by TA Instruments, Inc. called Universal Analysis 2000 (version 3.0G, build 3.0.0.93), a baseline is generated by drawing a line between the measured data at zero and 45 degrees Celsius. The area between the measured data and the baseline is then integrated to give an enthalpy value in Joules/gram. This enthalpy value is used to describe the state of the ePTFE article being examined and is generally between 5 and 15 Joules/gram.

Tensile Strength (Calendered Tape)

Mechanical testing of the unexpanded calendered tapes was accomplished in a similar manner to that used for ePTFE membranes. The major differences are that the sample geometry used here is a 0.635 cm wide by 10.16 cm long rectangular sample, the gauge length is 1.27 cm and the crosshead speed (pulling speed) is 2540 mm/min. The data analysis and matrix tensile strength calculations are identical to that shown for membranes, described below.

Matrix Tensile Strength (for Membranes)

Sample preparation was accomplished by using a die punch to cut 165 mm long by 15 mm wide rectangular samples out of the ePTFE membrane web. The membrane web was placed on the cutting table such that it was free from wrinkles in the area where the sample was to be cut. The 165 mm×15 mm die was then placed on the membrane (generally in the center 200 mm of the web) such that its long axis is parallel to the direction that will be tested. The directions quoted in this publication were measured in the machine direction (parallel to the direction of travel during processing) and the transverse direction (perpendicular to the direction of travel during processing). Once the die was aligned, pressure was applied to it to cut through the membrane web. Upon removal of this pressure, the rectangular sample for testing was inspected to ensure it was free from edge defects which may impact the tensile testing. At least 3 samples in the machine direction and three samples in the transverse direction was cut to characterize the membrane web. Once samples were prepared, they were measured to determine their mass (using a Mettler-Toledo analytical balance model AB104) and their thickness (using a Kafer FZ1000/30 snap gauge). Each sample was subsequently tested to determine its tensile properties using an Instron 5500 tensile tester running Merlin Series IX software (version 7.51). The samples were inserted into the tensile tester and held using Instron Catalog 2702-015 (rubber coated face plate) and 2702-016 (serrated face plate) grip plates such that each end of the sample was held between one rubber coated and one serrated face plate. The pressure applied to the grip plates was approximately 50 psi. The gauge length between the grips was set at 50 mm and the crosshead speed (pulling speed) was set to a speed of 508 mm/min. A 0.1 kN load cell was used to carry out these measurements and data was collected at a rate of 50 points/sec. The laboratory temperature was between 68 and 72 degrees Farenheit to ensure comparable results. Finally, if the sample happened to break at the grip interface, the data was discarded. At least 3 samples in the machine direction and three samples in the transverse direction were successfully pulled (no slipping out of or breaking at the grips) in order to characterize the membrane web.

The data analysis and calculations were performed with the Merlin software or any other data analysis package. First, the maximum load able to be supported by the sample during the tensile test was located. This maximum load was then normalized to the sample physical properties (thickness and density) via the following equation to calculate the matrix tensile strength.

$$MTS = F_{max} * \left(\frac{\rho_o * l}{100 * m}\right)$$

where:
MTS=Matrix tensile strength in Mpa
$F_{max}$=maximum load measured during test (Newtons)
$\rho_o$=theoretical density for PTFE (2.2 grams/cc)
l=sample length (cm)
m=sample mass (grams)

Density for Membranes

To measure the density of the membrane material examples of the present invention and the comparative examples, property data measured on the tensile samples was used. As noted above, the 165 mm×15 mm samples were measured to determine their mass (using a Mettler-Toledo analytical balance model AB104) and their thickness (using a Kafer FZ1000/30 snap gauge). Using this data, a density can be calculated with the following formula:

$$\rho = \frac{m}{w * l * t}$$

where:
ρ=density (g/cc)
m=mass (g)
w=width (1.5 cm)
l=length (16.5 cm)
t=thickness (cm)

Density for Gaskets

To measure the density of the gasketing material examples of the present invention and of the comparative examples, specimens having dimensions of about 25.4 mm in length and 25.4 mm in width were cut from the example sheets. The length, width, thickness and mass of each specimen were measured and recorded. The density of the specimen was determined from the following calculation:

Density(g/cc)=mass(g)/volume(cc)

where volume (cc)=length (cm)×width (cm)×thickness (cm)

Tensile Strength for Gaskets

Tensile strength was determined by tests performed in accordance with procedures outlined in ASTM D638-00 and ASTM F152-95 test procedures. Test specimens having dimensions in accordance with ASTM Standard D638-00 (Standard Test Method for Tensile Properties of Plastics) for a Type I specimen were cut from the gasketing material examples. Specimens were cut in the direction defined as the machine direction (MD) and transverse direction (TD) of the sheets. If the orientation of the sheet was not known or relevant, one set of test specimens was cut in line with one of the edges of the sheet and the second set was cut at 90° to the first set. The width and thickness of the specimens were measured at the narrow section of the specimens and recorded.

The specimens were tested using an Instron test machine with a 10 kN load cell. The extension rate was set at 12 inches/minute (305 mm/minute) and the initial jaw separation was set to 4 inches (102 mm). The Instron test machine automatically recorded the load and extension data. From the test data the tensile strength was determined by dividing the maximum load achieved during the test by the initial cross sectional area of the narrow region of the specimen.

Tensile Strength(TS)=maximum load/cross sectional area

The tensile strength reported is the higher tensile strength measured in two orthogonal directions for a given sample.

Matrix Tensile Strength

The Matrix Tensile Strength (MTS) of the gasket materials consisting essentially of expanded PTFE was calculated using the following equation:

MTS=TS×(2.2/ρ)

where:
TS=tensile strength,
ρ=density of the gasket material,
and 2.2 is the density of solid PTFE.

Crystallinity Index and Orientation Index

Wide angle x-ray scattering was used to determine crystallinity index and orientation indicies of the PTFE component for gaskets and membranes. All measurements were made in transmission mode using a Rigaku R-Axis IV Image Plate X-ray Analyzer mounted on a Rigaku Ultra 18 kW rotating anode x-ray generator a graphite monochromator and a 0.3 mm pinhole collimator. Operating conditions on the generator for all experiments were 50 kV and 200 mA. Radiation type was Cu $K_\alpha$. Sample-to-detector distance was set at 125-135 mm, and calibrated using a silicon powder standard. Two-dimensional image data was processed using Rigaku R-Axis image processing software, to obtain radial (I vs. 2θ) scans and azimuthal (I vs. φ) scans. The azimuthal scans were collected by integration over the angular range from 2θ=17.5° to 2θ=19.0° in increments of Δφ=1.0° to determine the orientation in the 100 plane of polytetrafluoroethylene, which is related to the orientation in the direction of the fiber axis. The radial scans were typically collected by integration over the angular range from 2θ~0° to 2θ~55° in increments of Δ2θ=0.044°.

Membrane samples were prepared by cutting and stacking strips of the membrane approximately 2.54 cm wide. All strips in the stack were aligned in the same direction relative to the machine direction and transverse direction of the original membrane sample. Gasket samples were prepared by cutting pieces approximately 0.5 cm by 0.5 cm square from larger sheets with edges aligned approximately parallel to the machine direction and transverse direction, and then sectioning the samples by slicing them parallel to their face to reduce the total sample thickness to ~0.6-1.0 mm. All samples were measured with the x-ray beam parallel to the direction normal to the sheet of the gasket or membrane which is perpendicular to both MD and TD, yielding planar orientation and planar crystallinity information. For convenience, membrane samples were measured with the MD positioned horizontally, and gasket samples were measured with the MD positioned vertically.

Figure 19:
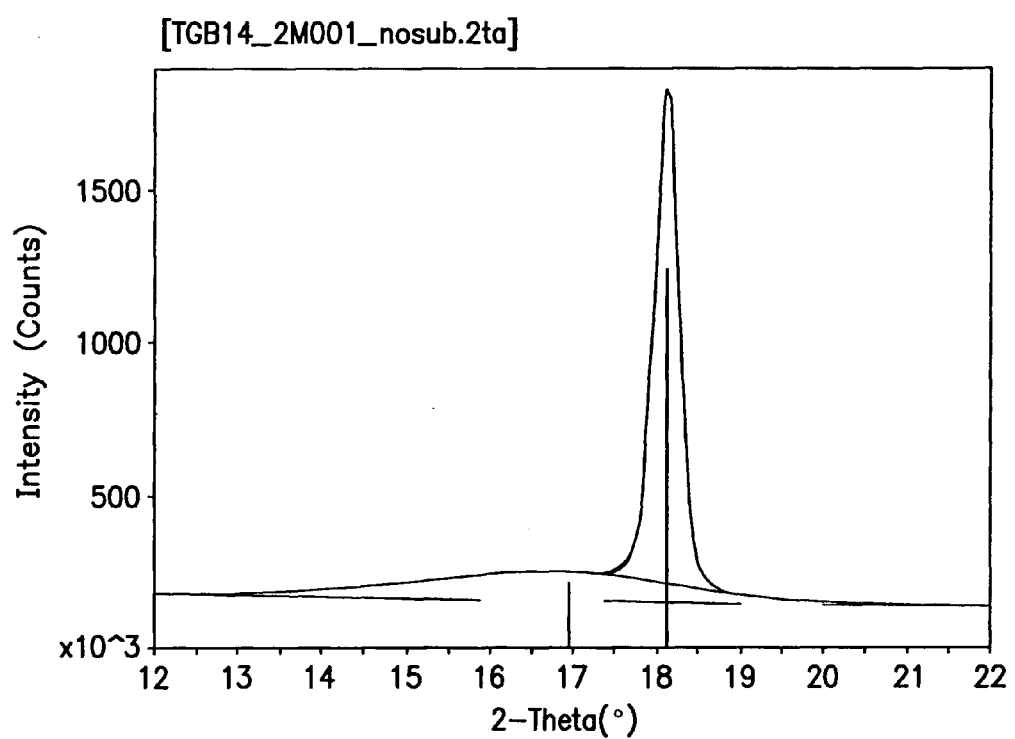
FIG. 19 is a graph of I vs. 2θ scans used in determining the crystallinity index characteristics of materials of the present invention.

The crystallinity index was obtained by peak fitting of I vs. 2θ scans using Jade 6.1 commercial XRD processing software from Materials Data, Inc. The scans were read into the software program and fit without further processing. The fitting procedure was as follows. The profile fitting range was limited to 2θ=12°-22.0°, and a linear background was defined such that it coincided with the measured intensity at 2θ=12° and 2θ=22°. This background is necessary to take into account intensity contributions due to air scattering and detector read noise that was determined from "blank" scans to be linear over the range of fitting. Two initial peaks were inserted at ~18.2° and ~16.5°, approximating positions of the 100 peak of the crystalline fraction and the amorphous peak, respectively, and then the profile fitting function was used to fit the peaks to the scan. The Pearson VII function was used to fit both peaks. The procedure was to first unify the shape and skew of both peaks and simultaneously fit a linear background and the Height, 2θ position, full-width at half-maximum intensity (FWHM), shape and skew of both peaks, followed by further refinement of the profiles by first releasing the condition of unifying the peak skew and then releasing the condition of unifying the peak shape. Using this fitting sequence, highly reproducible fits of both the amorphous and crystalline peaks were obtained with Residual Error of Fit values of 2.5% or less. A typical fitted profile is shown in FIG. 19. The crystallinity index was then calculated from the area under the fitted 100 crystalline peak ($A_{100}$) and the area under the fitted amorphous peak ($A_{amorphous}$) according to equation [1]:

$$\text{Crystallinity Index} = \{A_{100}/(A_{100}+A_{amorphous})\} \times 100\% \quad [1]$$

The crystallinity index was determined in this way for both membrane samples and gasket samples.

Figure 20:
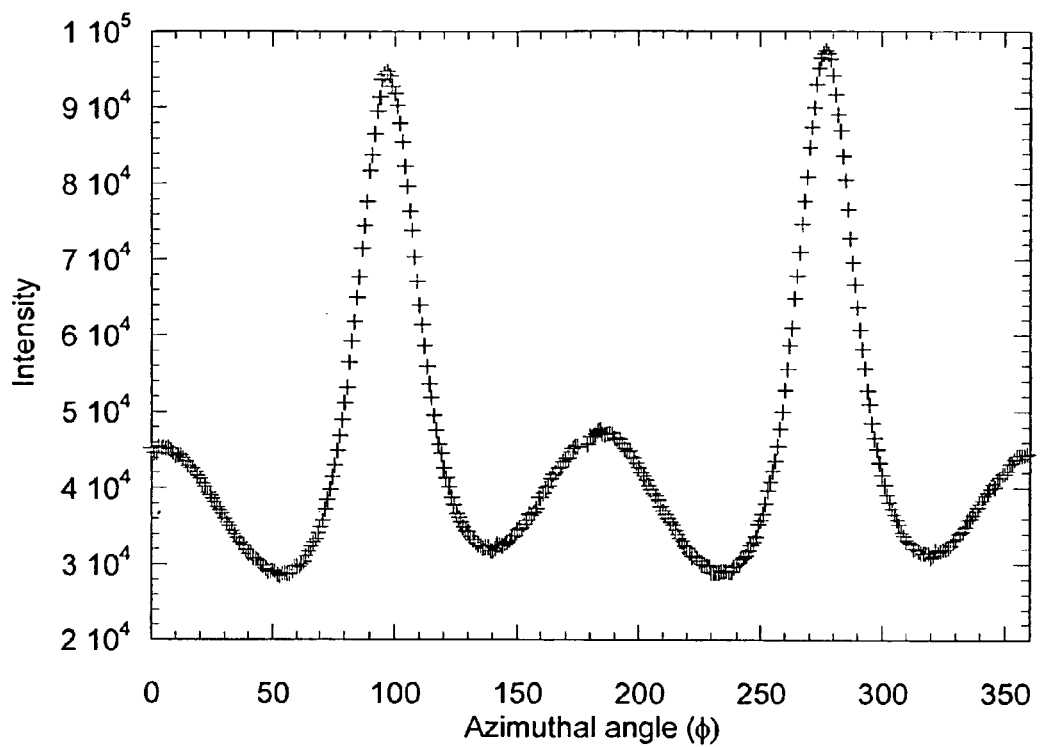
FIGS. 20 and 21 are representative azimuthal scans used in determining the crystallinity index characteristics of materials of the present invention.
Figure 21:
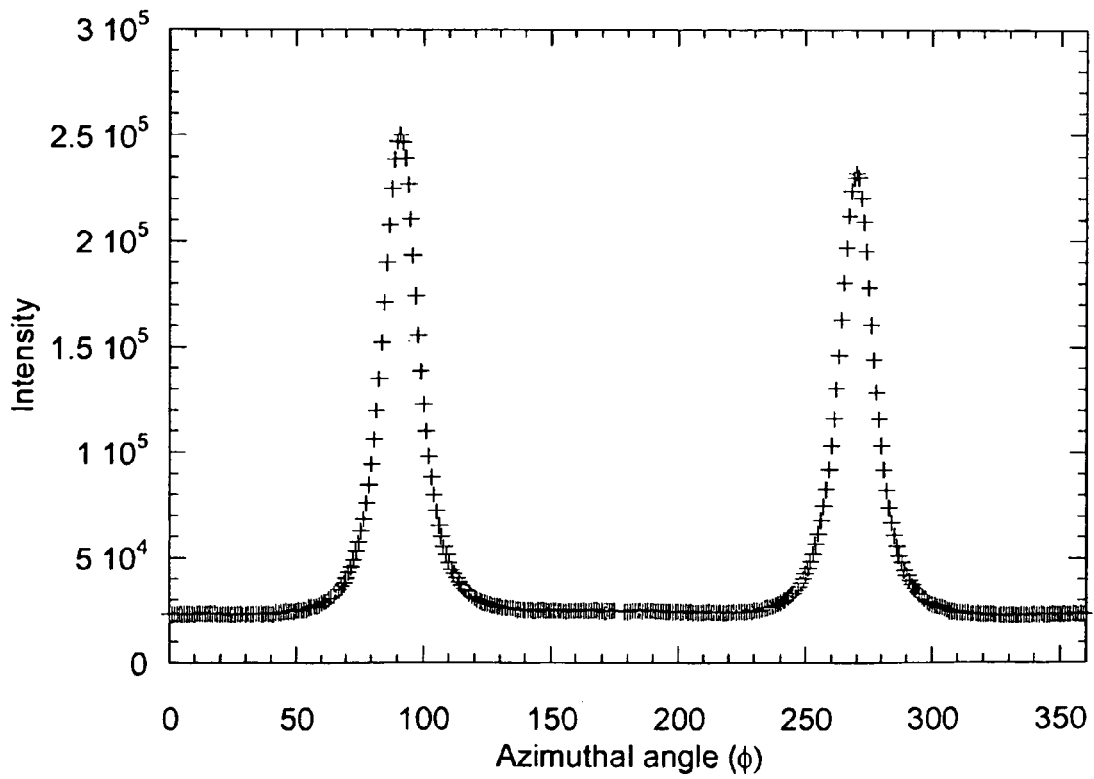

The orientation was quantified from I vs. ϕ azimuthal scans using two different parameters, the orientation angle index and the azimuthal intensity ratio index. Representative azimuthal scans are shown in FIGS. 20 and 21. It should be noted that the appearance of four intensity peaks in the azimuthal scan, as shown in FIG. 21, represents crystalline orientation along two different directions, for example, in both MD and TD. We believe this characteristic to be unique to our single-layered membrane materials.

For each azimuthal scan, intensity values are defined that represent the peak intensities ($I_{peak}$), the minimum measured intensity ($I_{min}$), and the background intensity for the azimuthal scan ($I_{\phi-bkg}$). The background intensity for the azimuthal scan is extracted from the I vs. 2θ integrated intensity scans, and includes amorphous contributions, air scatter, and contributions from detector read noise. The amorphous contribution is assumed to be unoriented for the purposes of calculating $I_{\phi-bkg}$. $I_{\phi-bkg}$ is determined from the average intensities of data points in the I vs. 2θ scan falling into the ranges immediately preceding and following the range in which the azimuthal intensity is calculated. More specifically, $I_{\phi-bkg}$ is equal to the average of the averages of intensity values corresponding to data points in the I vs. 2θ scan with $17.0° \leq 2\theta \leq 17.5°$ and $19.0° \leq 2\theta \leq 19.5°$, normalized to account for the summation of intensities in the azimuthal scan for all 2θ values falling in the azimuthal scan integration range (2θ=17.5°-19.0°) and the division of the total intensity integrated over the full 360° azimuthal range into 360 Δϕ=1.0° values. The minimum measured intensity, $I_{min}$, is defined as the average of the lowest numerical intensity value corresponding to each of the two lowest intensity minima observed on the I vs. ϕ plots, after artificially low intensity values corresponding to physical blocking by the beam stop were removed from the data sets. The peak intensities, $I_{peak}$, were simply chosen to be equal to the largest numerical intensity values corresponding to the observed intensity peaks on the I vs. ϕ plots.

For the two highest intensity peaks in each I vs. ϕ scan, the full-width at half the maximum peak intensity is determined from the difference of the angles corresponding to the intensity values closest to $I_{peak}/2$ on either side of the peak. These two FWHM values are averaged to obtain the Orientation Angle Index. The Azimuthal Intensity Ratio is defined by equation [2]:

$$\text{Azimuthal Intensity Ratio} = (I_{min} - I_{\phi-bkg})/(I_{peak} - I_{\phi-bkg}) \quad [2]$$

The Azimuthal Intensity Ratio was calculated for the two highest intensity peaks present in each I vs. ϕ scan and averaged to give the Azimuthal Intensity Ratio Index. This index gives a measure of the fraction of the crystalline portion of the material that is oriented in a given direction relative to the fraction of the crystalline portion of the material that has random orientation. It will take a value of approximately zero when the crystalline fraction of the material is fully directionally oriented and $I_{min} \sim I_{\phi-bkg}$, and a value of approximately one when the material is fully randomly oriented and $I_{peak} \sim I_{min}$.

Bolt Load Retention

The Bolt Load Retention test measures the amount of compressive load on a gasket sample over a period of time and through a thermal cycle. The thermal cycle consists of a ramp segment from room temperature to a specified elevated temperature, a specified dwell time at the elevated temperature, and a cool down segment back to room temperature. The load on the test gasket varies through the test based on the stress relaxation properties of the gasket material.

Annular test specimens were cut to the ANSI 2"×150 lb. class ring gasket dimensions with an outer diameter of 4.125" (104.8 mm) and inner diameter of 2.375" (60.3 mm). The test gaskets were placed between two blind, carbon steel ANSI 2"×150-lb class flanges with a surface finish of 250 RMS. The gasket/flanges were loaded into a platen press. The platen press had platens with electric cartridge heaters and a load capacity of 60,000 pounds. The flanges were compressed to an initial loading of approximately 46,100 pounds at a uniform rate over a three minute period. After the initial load was reached, the temperature of the platens was increased to 100° C. The temperature was held for at least four, and up to eight hours. At the end of the dwell time at elevated temperature, the platens were allowed to cool to room temperature. Once the platens reached room temperature (approximately 23° C.) the test was complete and the gasket was removed from the press and flanges.

The load on the gasket was measured and recorded electronically throughout the test. The percent bolt load retention (% BLR) is defined as the final load on the gasket at room temperature divided by the initial load and multiplied by 100:

% BLR=(final load at room temperature/initial load)× 100%.

The results of the bolt load retention test provide a means for comparing the creep and stress relaxation properties of different gasket materials. Since creep and stress relaxation in polymeric materials is dependent on mass, test specimens were produced and tested having a thickness that spanned the nominal commercially available gasket thicknesses, e.g., ranging from 1 mm to 6 mm. In order to produce the different thickness test specimens from the inventive examples, layers of the ePTFE membrane were removed from the gasket material sheets prior to cutting the annular rings to produce specimens with a thickness less than the original thickness of the sheet material described in the inventive examples. To produce test specimens having a thickness greater than that of the original thickness of the gasket materials of the inventive samples, the annular rings were stacked on top of each other until the desired thickness was reached with membrane layers being removed as necessary. The thickness and mass of the test specimen were measured and recorded prior to conducting the bolt load retention test.

Stress to Seal Test

Figure 22:
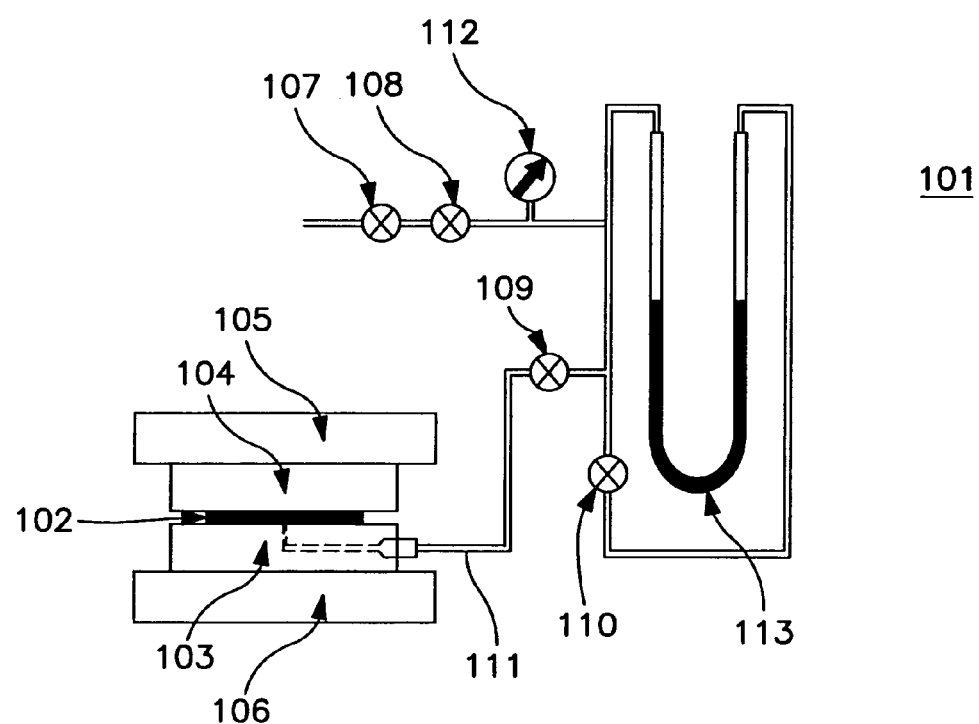
FIG. 22 is a photograph showing the apparatus used for determining the stress to seal values of materials of the present invention.

The "stress to seal" of a gasket, also known as the y-value, is the amount of compressive stress required on a gasket to provide an initial air tight seal at a specified internal pressure and ambient conditions. FIG. 22 shows the apparatus 101 used for determining the stress to seal values on the example gasket materials. An air tight, or air impermeable, seal is defined here as substantially no leakage as indicated by the fluid levels in the manometer of the test apparatus. These test procedures were developed based on the test method of ASTM F37-00, Standard Test Methods for Sealability of Gasket Materials.

For this test, annular test gasket samples 102 were cut from the example gasket material sheets where the annular test gaskets had an inner diameter of approximately 2.38 inches (60.5 mm) and an outer diameter of approximately 4.13 inches (105 mm). The thickness and mass of each test gasket sample were measured and recorded. The stress on the gaskets was determined by dividing the load on the gasket by the initial gasket area as defined by the nominal inner and outer diameters.

The test gasket was centered on the lower test platen 103. The upper test platen 104 was then placed on top of the test gasket, being careful not to move the test gasket from its centered position. The test platens had surface finishes of at least as smooth as RMS 32. The gasket/test platen assembly was then placed between upper platen 105 and lower platen 106 in a platen press and centered on the press platens over a load indicating transducer. A pre-selected initial load was applied to the gasket at a uniform rate over an approximately 1 minute period. The initial loads were selected as starting loads based on experience with various gasket materials. The initial load was reapplied to the gasket after waiting one minute to account for initial relaxation of the gasket material. Compressed air was supplied to the test gasket via the air regulator 107 and valves 108, 109, and 110. The air line 111 was connected to the fitting on the lower test platen. Valves 108, 109, and 110 were opened fully. The regulator 107 was adjusted until the gage 112 displayed a pressure of 30 psig (207 kPa). Valve 107 was then closed. At this point, the manometer 113 levels were checked to make sure they were equal to insure zero pressure differential in the system. Valve 109 was then closed to begin testing for leakage. Leakage was identified by a change in the manometer fluid levels.

If leakage was present, the air pressure was released from the system and the load on the gasket was increased. Compressed air was again supplied to the gasket and the manometer was checked for indications of leakage. These steps were repeated at increasing loads until a load was reached where no leakage occurred. Once a load was reached where no initial leakage occurred, the air pressure and load were maintained on the test gasket for a period of 30 minutes to insure that there was substantially no leakage. The "stress to seal" value was reached when there was substantially no change in the manometer levels after the 30 minute time period.

Creep for Gaskets

The creep of the gasket material examples was measured following the test procedures defined in DIN 28090-2. Test gaskets were cut from the example sheets having an inner diameter of 49 mm and an outer diameter of 92 mm and a nominal thickness of 1.6 mm. The DIN28090-2 test procedures test the deformation characteristics of gasket materials and specifically creep. Creep is defined in the ASTM International standard F 118-97 as a transient stress-strain condition in which the strain increases as the stress remains constant. The stress being applied to the test gasket in the DIN 28090-2 procedures is compressive. Therefore, a change in strain under the compressive stress due to creep in the gasket material results in a decrease in the thickness of the test gasket.

The test fixture for the DIN 28090-2 test consisted of a computer controlled hydraulic press with a force measurement cell, two independent heating plates and a gasket height caliper. The gaskets were tested between a pair of adaption plates which were constructed to apply the compressive load on a surface having an inner diameter of 55 mm and an outer diameter of 75 mm and surface finishes of Rz<6.3 μm. The gaskets were subjected to a preload of 1 Mpa for 1 minute. Then, a mainload of 25 Mpa was applied for 5 minutes. The load was then returned to 1 Mpa for 5 minutes. The mainload was reapplied and held for 16 hours. During the second mainload, the temperature was increased to 150° C. at a rate of 5 K/min and held for the duration of the 16 hour dwell.

The percent creep is defined as the percent change in thickness of the gaket sample at the end of dwell time of the first application of the mainload and the end of the dwell time of the second application of the mainload.

Durometer Hardness

The durometer of the various gasket material examples was measured using a PTC Instruments Type A Durometer, model #306L, from Pacific Transducer Corp., Los Angeles, Calif. Test samples having a nominal thickness of ⅛ inch (3 mm) were cut from the example gasketing material sheets and were tested in three locations at approximately 0.5 inches (12.7 mm) apart. The durometer tester was placed on the sample and a light hand force was applied to the tester until the base of the tester contacted the surface of the test sample. The durometer reading (Shore A scale) was read from the dial gage on the tester and recorded. The thickness of each test sample was also measured and recorded.

Compressibility

Compressibility of the example gasket materials was determined by compressing a test sample to a specified stress for a short period of time. The procedures described below were developed based on the test procedures defined in ASTM F 36-99, Standard Test Methods for Compressibility and Recovery of Gasket Materials.

Annular test specimen were cut from the example gasket material sheets such that the annular specimen had an inner diameter of approximately 0.5 inches (12.7 mm) and an outer diameter of approximately 1 inch (25.4 mm) with a nominal thickness of 1/16 inch (1.5 mm (for gaskets of thicker dimension, layers were removed to reach this nominal thickness). The initial thickness of each test specimen was measured and recorded. The test specimen was placed on the lower platen of the test fixture and centered. A solder plug, approximately 0.25 inches (6.4 mm) long, was placed on the lower platen inside of the inner diameter of the test specimen. The solder was used to capture the compressed thickness of the specimen under load. The solder has no appreciable recovery in thickness after the load is removed. Therefore, the thickness of the solder plug after the load was removed equaled the compressed thickness under the major load. The test consisted of three segments. The first segment was a pre-load segment where the test specimen was loaded to approximately 500 psi (3.4 MPa) for 15 seconds. The second segment consisted of the application of the major load of approximately 2500 psi (17.2 MPa) stress for 60 seconds. The third segment consisted of a return of the load to the pre-load level of approximately 500 psi (3.4 MPa) for 60 seconds. After the test was complete, the final thickness of the test specimen and solder plug was measured and recorded. The percent compressibility of a material was calculated from the equation:

Compressibility(%)=[(initial thickness−compressed thickness)/initial thickness]×100.

Membrane Comparative Examples

Membranes of the prior art were obtained and tested. Prior art membranes A and B were made in accordance with the teachings of U.S. Pat. No. 3,953,566 and prior art membranes C and D were made in accordance with the teachings of U.S. Pat. No. 5,476,589.

TABLE 1

| Prior Art | Longitudinal MTS (MPa) | Transverse MTS (MPa) | Orientation Index (degrees) | Density (g/cc) |
| --- | --- | --- | --- | --- |
| A | 49 | 107 | 71 | 0.44 |
| B | 123 | 132 | 180 | 0.4 |
| C | 173 | 133 | 50 | 0.7 |
| D | 792 | 91 | n/a | 0.48 |

(n/a = not available)

Example 1

An expanded PTFE membrane was produced by practicing the following steps in sequence:
1. Blending PTFE fine powder (PTFE 601A, DuPont, Wilmington, Del.) with a lubricant (Isopar K, Exxon, Houston, Tex.) in the proportion of 130 cc/lb
2. Compressing the lubricated powder into a cylindrical shape
3. Paste extruding at a reduction ratio of 135:1
4. Calendering to a thickness of 0.018 inch
5. Drying the tape in a convection oven set to 210° C.
6. Longitudinally stretching the tape between two banks of rollers separated by a 325° C. heat zone
7. Transversely stretching the longitudinally stretched tape in a 335° C. heat zone, while constraining the tape from shrinking in the longitudinal direction
8. Subjecting the stretched tape to a 380° C. heat zone while constrained.

The stretch rates for the longitudinal and transverse directions were 39.7%/sec and 56.2%/sec, respectively. The stretch ratios for the longitudinal and transverse directions were 6.05:1 and 16.1:1, respectively.

Tensile strengths were measured for calendered tape samples utilizing a strain rate of 20000%/min. Tensile strengths of membrane samples were measured using a strain rate of 1016%/min. The dry calendered tape had tensile strengths in the longitudinal and transverse directions of about 5520 psi (38 MPa) and 1760 psi (12.1 MPa), respectively. The final membrane had matrix tensile strengths in the longitudinal and transverse directions of about 223 MPa and 200 MPa, respectively. The membrane density was 0.27 g/cc.

The orientation index was 42.8° and the crystallinity index was 61.2%.

Example 2

Another membrane was made in accordance with the process described in Example 1 with the following exceptions. The stretch ratios for the longitudinal and transverse directions were 4.1:1 and 7.6:1, respectively.

The calendered tape process conditions were the same, yielding approximately the same longitudinal and transverse strengths. The final membrane had matrix tensile strengths in the longitudinal and transverse directions of about 186 MPa and 175 MPa, respectively. The membrane density was 0.38 g/cc. The orientation index was 27.62° and the crystallinity index was 55.06%.

Example 3

Another membrane was made in accordance with the process described in Example 1 with the following exceptions. The stretch ratios for the longitudinal and transverse directions were 4.75:1 and 15.3:1, respectively.

The calendered tape process conditions were the same, yielding approximately the same longitudinal and transverse strengths. The final membrane had matrix tensile strengths in the longitudinal and transverse directions of about 185 MPa and 250 MPa, respectively. The membrane density was 0.28 g/cc. The orientation index was 50.33° and the crystallinity index was 61.95%.

Example 4

Another membrane was made in accordance with the process described in Example 1 with the following exceptions. The stretch ratios for the longitudinal and transverse directions were 8:1 and 17.2:1, respectively.

The calendered tape process conditions were the same, yielding approximately the same longitudinal and transverse strengths. The final membrane had matrix tensile strengths in the longitudinal and transverse directions of about 245 MPa and 287 MPa, respectively. The membrane density was 0.32 g/cc. The orientation index was 20.27° and the crystallinity index was 68.67%.

Example 5

Another membrane was made in accordance with the process described in Example 1 with the following exceptions. The lubrication ratio was 120 cc/lb. The stretch ratios for the longitudinal and transverse directions were 4.75:1 and 16.1:1, respectively.

The resultant dry calendered tape in this example had tensile strengths in the longitudinal and transverse directions of about 5860 psi (40.4 MPa) and 1840 psi (12.7 MPa), respectively. The final membrane had matrix tensile strengths in the longitudinal and transverse directions of about 203 MPa and 231 MPa, respectively. The membrane density was 0.28 g/cc.

Example 6

Another membrane was made in accordance with the process described in Example 1 with the following exceptions. The lubrication ratio was 120 cc/lb. The stretch ratios for the longitudinal and transverse directions were 7.35:1 and 22.4:1, respectively.

The resultant dry calendered tape in this example had tensile strengths in the longitudinal and transverse directions of about 5860 psi (40.4 MPa) and 1840 psi (12.7 MPa), respectively. The final membrane had matrix tensile strengths in the longitudinal and transverse directions of about 235 MPa and 294 MPa, respectively. The membrane density was 0.38 g/cc. The orientation index was 20.35° and the crystallinity index was 70.02%.

Example 7

Another membrane was made in accordance with the process described in Example 1 with the following exceptions. The stretch ratios for the longitudinal and transverse directions were 8:1 and 7.1:1, respectively.

The calendered tape process conditions were the same, yielding approximately the same longitudinal and transverse strengths. The final membrane had matrix tensile strengths in the longitudinal and transverse directions of about 310 MPa and 77 MPa, respectively. The membrane density was 0.28 g/cc. The orientation index was 27.34° and the crystallinity index was 61.51%.

Example 8

Another membrane was made in accordance with the process described in Example 1 with the following exceptions. The stretch ratios for the longitudinal and transverse directions were 1.5:1 and 10.4:1, respectively. The tape was calendered to a thickness of 0.008 inch.

The dry calendered tape had tensile strengths in the longitudinal and transverse directions of about 9620 psi (66.3 MPa) and 1400 psi (9.7 MPa), respectively. The final membrane had matrix tensile strengths in the longitudinal and transverse directions of about 90 MPa and 280 MPa, respectively. The membrane density was 0.55 g/cc. The orientation index was 16.12° and the crystallinity index was 57.17%.

Example 9

Another membrane was made in accordance with the process described in Example 1 with the following exceptions. The stretch ratios for the longitudinal and transverse directions were 6.7:1 and 14.3:1, respectively.

The calendered tape process conditions were the same, yielding approximately the same longitudinal and transverse strengths. The final membrane had matrix tensile strengths in the longitudinal and transverse directions of about 251 MPa and 258 MPa, respectively. The membrane density was 0.31 g/cc. The orientation index was 35.88° and the crystallinity index was 66.77%.

Process and membrane property data pertaining to Examples 1 through 9 appear in the following tables:

TABLE 2

| Ex. | Lubricant Level (cc/lb) | Thickness of Calendered Tape (inch) | Calendered Tape Longitudinal MTS (psi) | Calendered Tape Transverse MTS (psi) |
|---|---|---|---|---|
| 1 | 130 | 0.018 | 5520 | 1760 |
| 2 | 130 | 0.018 | 5520 | 1760 |
| 3 | 130 | 0.018 | 5520 | 1760 |
| 4 | 130 | 0.018 | 5520 | 1760 |
| 5 | 120 | 0.018 | 5860 | 1840 |
| 6 | 120 | 0.018 | 5860 | 1840 |
| 7 | 130 | 0.018 | 5520 | 1760 |
| 8 | 130 | 0.008 | 9620 | 1400 |
| 9 | 130 | 0.018 | 5520 | 1760 |

TABLE 3

| Ex. | Stretch Temperature (deg. C.) Long.; trans. | Longitudinal Stretch Ratio | Longitudinal Stretch Rate (%/sec) | Transverse Stretch Ratio | Transverse Stretch Rate (%/sec) | Heat Setting Temp (° C.) |
|---|---|---|---|---|---|---|
| 1 | 325; 335 | 6.1 | 39.7 | 16.1 | 56.2 | 380 |
| 2 | 365; 380 | 4.1 | 26.8 | 7.6 | 59.3 | 380 |
| 3 | 350; 350 | 4.8 | 32.4 | 15.3 | 55.2 | 380 |
| 4 | 354; 350 | 8.0 | 50.7 | 17.2 | 91.2 | 380 |
| 5 | 350; 350 | 4.8 | 32.4 | 16.1 | 55.7 | 380 |
| 6 | 354; 350 | 7.4 | 49.1 | 22.4 | 92.5 | 380 |
| 7 | 325; 335 | 8.0 | 50.7 | 7.1 | 54.8 | 380 |
| 8 | 361; 380 | 1.5 | 13.2 | 10.4 | 31.3 | 380 |
| 9 | 351; 350 | 6.7 | 43.4 | 14.3 | 65.3 | 380 |

TABLE 4

| Ex. | Final Membrane Long. MTS (MPa) | Final Membrane Trans. MTS (MPa) | Final Membrane Density (g/cc) | Orientation Index (degrees) | Crystallinity Index (%) |
|---|---|---|---|---|---|
| 1 | 223 | 200 | 0.27 | 42.8 | 61.2 |
| 2 | 186 | 175 | 0.38 | 27.62 | 55.06 |
| 3 | 185 | 250 | 0.28 | 50.33 | 61.95 |
| 4 | 245 | 287 | 0.32 | 20.27 | 68.67 |
| 5 | 203 | 231 | 0.28 | n/a | n/a |
| 6 | 235 | 294 | 0.38 | 20.35 | 70.02 |
| 7 | 310 | 77 | 0.28 | 27.34 | 61.51 |
| 8 | 90 | 280 | 0.55 | 16.12 | 57.17 |
| 9 | 251 | 258 | 0.31 | 35.88 | 66.77 |

Gasket Comparative Examples

Gaskets of the prior art were obtained and tested for mechanical properties. The test results appear in the following tables:

TABLE 5

| Prior Art | Thickness (mm) | Density (g/cc) | Tensile Strength (MPa) | Matrix Tensile Strength (MPa) | Crystallinity Index (%) |
|---|---|---|---|---|---|
| ⅛ inch GR sheet[1] | 3.38 | 0.57 | 36.9 | 142.3 | 47.48 |
| 1/16 inch GR sheet[1] | n/a | n/a | n/a | n/a | 47.48 |
| ¼ inch GR sheet[1] | n/a | n/a | n/a | n/a | 47.48 |
| 1 mm GR sheet[1] | n/a | n/a | n/a | n/a | 47.48 |
| Inertex[2] | 3.37 | 0.89 | 19.4 | 48.0 | 59.36 |
| 3 mm Blue Gylon[3] | 3.07 | 1.62 | n/a | n/a | n/a |
| 1.5 mm Blue Gylon[3] | 1.48 | 1.61 | 17.9 | n/a | n/a |

[1]GORE-TEX GR ® sheet gasketing, W. L. Gore & Associates, Inc., Elkton, MD
[2]INERTEX ® SQ-S Gasket Sheet, Inertech, Inc., Monterey Park, CA
[3]Blue Gylon ® Gasketing, Style 3504, Garlock ® Sealing Technologies, Palmyra, NY

TABLE 6

| Prior Art | Bolt Load Retention (%) 1 mm; 1.6 mm; 3.2 mm; 6.4 mm | Creep | Compressibility (%) | Stress to Seal (MPa) |
|---|---|---|---|---|
| ⅛ inch GR sheet[1] | n/a; n/a; 79.05; n/a | n/a | n/a | 22.1 |
| 1/16 inch GR sheet[1] | n/a; 90.70; n/a; n/a | 6.1 | 58.5 | 19.0 |
| ¼ inch GR sheet[1] | n/a; n/a; n/a; 62.3 | n/a | n/a | n/a |
| 1 mm GR sheet[1] | 92.8; n/a; n/a; n/a | n/a | n/a | n/a |
| Inertex[2] | n/a; n/a; 66.2; n/a | n/a | n/a | 24.8 |
| 3 mm Blue Gylon[3] | n/a; n/a; 52.3; n/a | n/a | n/a | 12.4 |
| 1.5 mm Blue Gylon[3] | n/a; 71.4; n/a; n/a | n/a | 15.7 | 15.7 |

Example 10

A gasket material was constructed utilizing the membrane of Example 4. Approximately 143 layers of the ePTFE membrane were wrapped on a stainless steel mandrel such that the longitudinal direction of the membrane was oriented circumferentially around the mandrel. The mandrel had an outer diameter of approximately 600 mm and a length of approximately 1370 mm. The membrane layers were secured at the ends of the mandrel to restrain the membrane from shrinking at elevated temperatures. The membrane and mandrel were placed in a forced air oven set at 365° C. for approximately 45 minutes. After removal from the oven and allowed to cool, the ePTFE material was circumferentially cut at both ends of the mandrel and then cut along the length of the mandrel. The expanded PTFE was then removed from the mandrel in the form of a sheet.

The tensile strength of the gasket material in the machine direction was 53.3 MPa (MTS=186.3 MPa). The tensile strength of the gasket material in the transverse direction was 64.5 MPa (MTS=225.2 MPa). Thus, the reported tensile strength (highest) of the gasket material was 64.5 MPa (MTS=225.2 MPa). The average thickness and density of the gasket material, as produced, were 2.0 mm and 0.63 g/cc, respectively. The crystallinity index of the gasket material was 69.5%.

A 1 mm nominal thickness gasket of this Example (i.e., layers removed to achieve this nominal thickness) was measured to have a bolt load retention value of 93.35%. A 1.5 mm nominal thickness gasket of this Example (layers removed) was measured to have a bolt load retention value of 93.17% and a stress to seal value of 18.4 MPa. The 3 mm nominal thickness gasket of this Example (formed with stacked layers) was measured to have a bolt load retention value of 88.5%. A 6 mm nominal thickness gasket of this Example (formed with stacked layers) was measured to have a bolt load retention value of 83.95%. Compressibility was measured to be 63.3%. The thickness of the samples used to measure compressibility were, on average, 1.69 mm. Creep was measured to be 3.1%. The thickness of the creep sample was 1.84 mm. Durometer was measured to be 67. The thickness of the durometer sample was 2.92 mm.

Example 11

Another gasket material was made in accordance with the process described in Example 10 with the following exceptions. Approximately 130 layers of the membrane of Example 3 were circumferentially wrapped around the mandrel.

The tensile strength of the gasket material in the machine direction was 43.9 MPa (MTS=146.4 MPa). The tensile strength of the gasket material in the transverse direction was 50.3 MPa (MTS=167.7 MPa). Thus, the reported tensile strength (highest) of the gasket material was 50.3 MPa (MTS=167.7 MPa). The average thickness and density of the gasket material, as produced, were 3.3 mm and 0.66 g/cc, respectively. The crystallinity index of the gasket material was 62.7%.

The 1 mm nominal thickness gasket (layers removed) was measured to have a bolt load retention value of 93.25%. The 3 mm nominal thickness gasket (layers removed) was measured to have a bolt load retention value of 86.77% and a stress to seal value of 22.5 MPa. The 6 mm nominal thickness gasket (stacked layers) was measured to have a bolt load retention value of 69.40%. Compressibility was measured to be 61.0%. The thickness of the samples used to measure compressibility were on average 1.69 mm. Durometer was measured to be 66. The thickness of the durometer sample was 2.82 mm.

Example 12

Another gasket material was made in accordance with the process described in Example 10 with the following exceptions. Approximately 110 layers of the membrane of Example 1 were circumferentially wrapped around the mandrel.

The tensile strength of the gasket material in the machine direction was 42.7 MPa (MTS=177.3 MPa). The tensile strength of the gasket material in the transverse direction was 42.4 MPa (MTS=176.0 MPa). Thus, the reported tensile strength (highest) of the gasket material was 42.7 MPa (MTS=177.3 MPa). The average thickness and density of the gasket material, as produced, were 2.3 mm and 0.53 g/cc, respectively. The crystallinity index of the gasket material was 60.83%.

The 1 mm nominal thickness gasket (layers removed) was measured to have a bolt load retention value of 93.10%. The 1.5 mm nominal thickness gasket (layers removed) was measured to have a bolt load retention value of 91.33% and a stress to seal value of 20.2 MPa. The 3 mm nominal thickness gasket (stacked layers) was measured to have a bolt load retention value of 86.03%. Compressibility was measured to be 64.9%. The thickness of the samples used to measure compressibility were on average 1.59 mm. Durometer was measured to be 67. The thickness of the durometer sample was 2.74 mm.

Example 13

Another gasket material was made in accordance with the process described in Example 10 with the following exceptions. Approximately 40 layers of the membrane of Example 7 were circumferentially wrapped around the mandrel. Also, a different mandrel size was used. Both the outer diameter and length of the mandrel were approximately 600 mm.

The tensile strength of the gasket material in the machine direction was 54.6 MPa (MTS=230.9 MPa). The tensile strength of the gasket material in the transverse direction was 13.4 MPa (56.7 MPa). Thus, the reported tensile strength (highest) of the gasket material was 54.6 MPa (MTS=230.9 MPa). The average thickness and density of the gasket material, as produced, were 2.3 mm and 0.52 g/cc, respectively.

The 1.5 mm nominal thickness gasket (layers removed) was measured to have a bolt load retention value of 90.90%.

The 2 mm nominal thickness gasket (layers stacked) was measured to have a stress to seal value of 20.2 MPa. The 3 mm nominal thickness gasket (layers stacked) was measured to have a bolt load retention value of 87.45%. Durometer was measured to be 51. The thickness of the durometer sample was 3.56 mm.

Example 14

Another gasket material was made in accordance with the process described in Example 10 with the following exceptions. A mandrel having an outer diameter of 600 mm and a length of 600 mm was used. Two different membranes were used in the construction of the sheet. Approximately 22 layers of the membrane of Example 7 and approximately 22 layers of the membrane of Example 8 were circumferentially wrapped around the mandrel. One payoff spool was positioned above the other such that both membrane types were fed together onto the mandrel, thereby resulting in alternating layers of the membranes.

The tensile strength of the gasket material in the machine direction was 32.7 MPa (MTS=138.3 MPa). The tensile strength of the gasket material in the transverse direction was 28.8 MPa (MTS=121.8 MPa). Thus, the reported tensile strength (highest) of the gasket material, as produced, was 32.7 MPa (MTS=138.3 MPa). The average thickness and density of the gasket material, as produced, were 1.9 mm and 0.52 g/cc, respectively.

The 1.5 mm nominal thickness gasket was measured to have a stress to seal value of 23.8 MPa. The 3 mm nominal thickness gasket (layers stacked) was measured to have a bolt load retention value of 87.07%.

Example 15

Another gasket material was made in accordance with the process described in Example 10 with the following exceptions. Approximately 250 layers of the membrane of Example 6 were circumferentially wrapped around the mandrel having both an outer diameter and length of approximately 600 mm.

The tensile strength of the gasket material in the machine direction was 44.1 MPa (MTS=183.1 MPa). The tensile strength of the gasket material in the transverse direction was 61.1 MPa (MTS=253.5 MPa). Thus, the reported tensile strength (highest) of the gasket material was 61.1 MPa (MTS=253.5 MPa). The thickness and crystallinity index of the gasket material, as produced, were 3.13 mm and 73.6%, respectively.

The 3 mm nominal thickness gasket was measured to have a bolt load retention value of 91.87% and a stress to seal value of 24.8 MPa. The 6 mm nominal thickness gasket was measured to have a bolt load retention value of 79.0%. Durometer was measured to be 67. The thickness of the durometer sample was 3.30 mm.

Example 16

A gasket material was constructed in accordance with the teachings of U.S. Pat. No. 6,485,809 to Minor et al utilizing the membrane of Example 5 and an expanded PTFE sheet which had been calendered to reduce the porosity therein. The reduced porosity expanded PTFE sheet was produced by calendering three layers of an ePTFE membrane between two rollers separated by a fixed gap. The expanded PTFE membrane used to produce the reduced porosity expanded PTFE sheet was produced in accordance with the teachings of U.S. Pat. No. 3,953,566, to Gore. The thickness and density of the expanded PTFE membrane were 0.082 mm and 0.4 g/cc, respectively. After calendering the three membrane layers, the reduced porosity expanded PTFE sheet had a thickness and density of 0.045 mm and 1.85 g/cc, respectively. One layer of the sheet was wrapped around a stainless steel mandrel having an outer diameter of approximately 1000 mm and a length of approximately 1600 mm.

Approximately 104 layers of the membrane of Example 5 were then wrapped over top of the previously wrapped reduced porosity expanded PTFE sheet. A second layer of the reduced porosity ePTFE sheet was then wrapped over the top layer of the ePTFE membrane. Another approximately 110 layers of the ePTFE membrane of Example 5 were wrapped over top of the second nearly nonporous ePTFE sheet. The layers were secured at the ends of the mandrel to prevent them from shrinking at elevated temperatures. The layers of ePTFE were sintered in a forced air oven set to 365° C. for approximately 55 minutes. After cooling, the ePTFE material was circumferentially cut at both ends of the mandrel and then cut along the length of the mandrel and removed in the form of a composite sheet. The composite sheet was separated into two sheets by peeling apart the composite sheet at the interface between the second reduced porosity expanded PTFE sheet layer and the second approximately 110 layers of the membrane of Example 5. The sheet comprising the two outer layers of the reduced porosity expanded PTFE sheets and the approximately 104 layers of the membrane of Example 5 constituted the gasket material of the present example.

After being cut from the gasket material, the samples for the Bolt Load Retention and Stress to Seal test were compressed along the inner diameter as taught in U.S. Pat. No. 6,485,809 to Minor et al to complete the low stress to seal gasket construction. The 3 mm nominal thickness gaskets were measured to have a bolt load retention of 88.5% and a stress to seal of 9.7 MPa. The durometer was measured to be 73. The thickness of the durometer sample was 2.54 mm.

Example 17

The gasket material of the present example comprised the approximately 110 layers of ePTFE membrane separated from the composite sheet described in Example 16.

The tensile strength of the gasket material in the machine direction was 45.4 MPa (MTS=146.9 MPa). The tensile strength of the gasket material in the transverse direction was 51.8 MPa (MTS=167.5 MPa). Thus, the reported tensile strength (highest) of the gasket material was 51.8 MPa (MTS=167.5 MPa). The average thickness and density of the gasket material were 2.5 mm and 0.68 g/cc, respectively.

The 3 mm nominal thickness gasket (layers stacked) was measured to have a bolt load retention of 87.64%. The durometer was measured to be 69. The thickness of the durometer sample was 2.36 mm.

Gasket material property data pertaining to Examples 10 through 17 appear in the following tables:

TABLE 7

| Ex. | Thickness (mm) | Density (g/cc) | Tensile Strength (MPa) | Matrix Tensile Strength (MPa) | Stress to Seal (MPa) 1.5 mm; 2 mm; 3.0 mm |
|---|---|---|---|---|---|
| 10 | 2.0 | 0.63 | 64.5 | 225.2 | 18.4; n/a; n/a |
| 11 | 3.3 | 0.66 | 50.3 | 167.7 | n/a; n/a; 22.5 |
| 12 | 2.3 | 0.53 | 42.7 | 177.3 | 20.2; n/a; n/a |
| 13 | 2.3 | 0.52 | 54.6 | 230.9 | n/a; 20.2; n/a |
| 14 | 1.9 | 0.52 | 32.7 | 138.3 | 23.8; n/a; n/a |

TABLE 7-continued

| Ex. | Thickness (mm) | Density (g/cc) | Tensile Strength (MPa) | Matrix Tensile Strength (MPa) | Stress to Seal (MPa) 1.5 mm; 2 mm; 3.0 mm |
|---|---|---|---|---|---|
| 15 | 3.1 | 0.53 | 61.1 | 253.5 | n/a; n/a; 24.8 |
| 16 | 2.4 | n/a | n/a | n/a | n/a; 9.7; n/a |
| 17 | 2.5 | 0.68 | 51.8 | 167.5 | n/a; n/a; n/a |

TABLE 7a

| Ex. | Durometer | Thickness for Durometer (mm) | Bolt Load Retention (%) 1 mm; 1.5 mm; 3 mm; 6 mm |
|---|---|---|---|
| 10 | 67 | 2.92 | 93.35; 93.17; 88.50; 83.95 |
| 11 | 66 | 2.82 | 93.25; n/a; 86.77; 69.40 |
| 12 | 67 | 2.74 | 93.10; 91.33; 86.03; n/a |
| 13 | 51 | 3.56 | n/a; 90.90; 87.45; n/a |
| 14 | n/a | n/a | n/a; n/a; 87.07; n/a |
| 15 | 67 | 3.3 | n/a; n/a; 91.87; 79.00 |
| 16 | 73 | 2.54 | n/a; n/a; 88.5; n/a |
| 17 | 69 | 2.36 | n/a; n/a; 87.64; n/a |

TABLE 8

| Ex. | Crystallinity Index (%) | Creep | Thickness for Creep (mm) | Compressibility (%) | Thickness for Compressibility (mm) |
|---|---|---|---|---|---|
| 10 | 69.5 | 3.1 | 1.84 | 63.3 | 1.69 |
| 11 | 62.7 | n/a | n/a | 61.0 | 1.69 |
| 12 | 60.83 | n/a | n/a | 64.9 | 1.59 |
| 13 | n/a | n/a | n/a | n/a | n/a |
| 14 | n/a | n/a | n/a | n/a | n/a |
| 15 | 73.6 | n/a | n/a | n/a | n/a |
| 16 | n/a | n/a | n/a | n/a | n/a |
| 17 | n/a | n/a | n/a | n/a | n/a |

The invention claimed is:

1. A gasket comprising multilayer expanded PTFE, said gasket having:
   a thickness in the range of about 1.5 mm to about 9 mm,
   a crystallinity index of at least about 60%
   a compressibility of at least about 40%,
and a percent bolt load retention versus thickness equal to or greater than the line connecting points A and B in FIG. 18 and defined in the following table:

| Point | % BLR at RT | Thickness |
|---|---|---|
| A | 92% | 1.5 mm |
| B | 52% | 9 mm. |

2. The gasket of claim 1, wherein said gasket has a tensile strength in at least one direction of at least about 5,500 psi (37.9 MPa).

3. The gasket of claim 1, wherein said gasket has a durometer of about 85 or less.

4. The gasket of claim 1, wherein said gasket has a matrix tensile strength of at least about 22,000 psi (151.7 MPa).

5. The gasket of claim 1, wherein said gasket consists essentially of PTFE.

6. The gasket of claim 1, wherein said gasket has a percent bolt load retention versus thickness equal to or greater than the line connecting the points C and D in FIG. 18 and defined in the following table:

| Point | % BLR at RT | Thickness |
|---|---|---|
| C | 93% | 1.5 mm |
| D | 70% | 9 mm. |

7. The gasket of claim 6, wherein said gasket has a tensile strength in at least one direction of at least about 5,500 psi (37.9 MPa).

8. The gasket of claim 6, wherein said gasket has a durometer of about 85 or less.

9. The gasket of claim 6, wherein said gasket has a matrix tensile strength of at least about 22,000 psi (151.7 MPa).

10. The gasket of claim 7, wherein said gasket consists essentially of PTFE.

11. A gasket comprising multilayer expanded PTFE having a nominal thickness of 1.5 mm, a crystallinity index of at least about 60%, a bolt load retention of at least about 91% and a compressibility of at least 40%.

12. The gasket of claim 11, wherein said gasket has a tensile strength in at least one direction of at least about 5,500 psi (37.9 MPa).

13. A gasket comprising multilayer expanded PTFE having a nominal thickness of 2 mm, a crystallinity index of at least about 60%, a bolt load retention of at least about 90% and a compressibility of at least 40%.

14. The gasket of claim 13, wherein said gasket has a tensile strength in at least one direction of at least about 5,500 psi (37.9 MPa).

15. A gasket comprising multilayer expanded PTFE having a nominal thickness of 3 mm, a crystallinity index of at least about 60%, a bolt load retention of at least about 85% and a compressibility of at least 40%.

16. The gasket of claim 15, wherein said gasket has a tensile strength in at least one direction of at least about 5,500 psi (37.9 MPa).

17. A gasket comprising multilayer expanded PTFE having a nominal thickness of 6 mm, a crystallinity index of at least about 60%, a bolt load retention of at least about 65% and a compressibility of at least 40%.

18. The gasket of claim 17, wherein said gasket has a tensile strength in at least one direction of at least about 5,500 psi (37.9 MPa).

* * * * *

UNITED STATES PATENT AND TRADEMARK OFFICE
CERTIFICATE OF CORRECTION

| | | |
|---|---|---|
| PATENT NO. | : 7,829,170 B1 | Page 1 of 1 |
| APPLICATION NO. | : 11/059849 | |
| DATED | : November 9, 2010 | |
| INVENTOR(S) | : Christopher Bowen et al. | |

It is certified that error appears in the above-identified patent and that said Letters Patent is hereby corrected as shown below:

Column 1, line 37, "density" should be --densify--;

Column 4, line 50, "4b" should read --4--.

Signed and Sealed this
Twelfth Day of April, 2011

David J. Kappos
*Director of the United States Patent and Trademark Office*